US012132340B2

United States Patent
Jeong et al.

(10) Patent No.: US 12,132,340 B2
(45) Date of Patent: Oct. 29, 2024

(54) METHODS AND SYSTEMS FOR BATTERY MANAGEMENT

(71) Applicant: Google LLC, Mountain View, CA (US)

(72) Inventors: Hae Rim Jeong, San Francisco, CA (US); Jimmy Lim, Mountain View, CA (US); Dietrich Shing-Quan Ho, Mountain View, CA (US); Kevin Zeng, San Francisco, CA (US)

(73) Assignee: Google LLC, Mountain View, CA (US)

( * ) Notice: Subject to any disclaimer, the term of this patent is extended or adjusted under 35 U.S.C. 154(b) by 578 days.

(21) Appl. No.: 17/309,981

(22) PCT Filed: Jan. 28, 2020

(86) PCT No.: PCT/US2020/015381
§ 371 (c)(1),
(2) Date: Jul. 7, 2021

(87) PCT Pub. No.: WO2020/159966
PCT Pub. Date: Aug. 6, 2020

(65) Prior Publication Data
US 2022/0077691 A1    Mar. 10, 2022

Related U.S. Application Data

(60) Provisional application No. 62/798,314, filed on Jan. 29, 2019.

(51) Int. Cl.
*H02J 7/00* (2006.01)
(52) U.S. Cl.
CPC ............ *H02J 7/005* (2020.01); *H02J 7/0048* (2020.01); *H02J 7/00714* (2020.01)

(58) Field of Classification Search
CPC ....... H02J 7/005; H02J 7/0048; H02J 7/00714
See application file for complete search history.

(56) References Cited

U.S. PATENT DOCUMENTS

| | | |
|---|---|---|
| 6,498,454 B1 | 12/2002 | Pinlam et al. |
| 8,829,847 B2 | 9/2014 | Eaton et al. |
| 2015/0340897 A1 | 11/2015 | Uan-Zo-Li et al. |
| 2016/0089992 A1 | 3/2016 | Le et al. |
| 2016/0261122 A1 | 9/2016 | Childress et al. |

(Continued)

OTHER PUBLICATIONS

"Foreign Office Action", EP Application No. 21191102.9, Sep. 8, 2023, 4 pages.

(Continued)

*Primary Examiner* — Robert Grant
(74) *Attorney, Agent, or Firm* — Colby Nipper PLLC

(57) ABSTRACT

The various implementations described herein include methods, devices, and systems for managing battery usage and charging In one aspect, a method is performed at a battery charging device that includes one or more processors and memory. The method includes receiving first battery life information for a first battery installed in an electronic device, receiving user demand information for the electronic device, and based on the first battery life information and the user demand information, adjusting a charging rate for a second battery electrically coupled to the battery charging device for charging, the second battery configured for use in the electronic device.

20 Claims, 14 Drawing Sheets

(56) References Cited

U.S. PATENT DOCUMENTS

2017/0070081 A1* 3/2017 Cher .................. H02J 3/381
2018/0254640 A1* 9/2018 Jung .................. H02J 7/16

OTHER PUBLICATIONS

Intent to Grant dated Jun. 2, 2021, from counterpart European Application No. 20707977.3, 58 pp.
International Preliminary Report on Patentability from International Application No. PCT/US2020/015381, mailed Aug. 12, 2021, 7 pp.
"Extended European Search Report", EP Application No. 21191102.9, Oct. 22, 2021, 6 pages.
Communication under Rule 71(3) EPC from counterpart European Application No. 20707977.3, dated Jun. 2, 2021, 58 pp.
International Search Report from International Application No. PCT/US2020/015381, mailed Sep. 4, 2020, 3 pp.
Written Opinion from International Application No. PCT/US2020/015381, mailed Sep. 4, 2020, 3 pp.

* cited by examiner

Battery Alert:

The battery for your "Backyard Camera" will require charging in approximately 2 days.

Order a back-up battery here to avoid downtime during charging.

550

Battery Alert:

The battery for your "Backyard Camera" is near end-of-life.

Disposal options here.
Order a replacement battery here.

552

Battery Alert:

Replace your "Backyard Camera" battery prior to your scheduled trip to Kansas.

The battery in your charger is ready.

| Battery Management Table 800 | | | | | |
|---|---|---|---|---|---|
| Battery ID | Current Device | Current Charge | Maximum Charge | ••• | Estimated Life |
| 16 | Backyard Cam | 51% | 99% | | 50 cycles |
| 18 | Porch Cam | 76% | 95% | | 47 cycles |
| 7 | Thermostat | 47% | 80% | | 13 cycles |
| 3 | Charger | 50% | 98% | | 49 cycles |

Figure 8A

| Device Management Table 810 | | | | | |
|---|---|---|---|---|---|
| Device ID | Device Label | Current Charge | Estimated Time | ••• | Priority |
| 8 | Backyard Cam | 51% | 31 days | | 2 |
| 1 | Porch Cam | 76% | 40 days | | 1 |
| 11 | Thermostat | 47% | 48 days | | 3 |

Figure 8B

METHODS AND SYSTEMS FOR BATTERY MANAGEMENT

TECHNICAL FIELD

This relates generally to battery charging, including but not limited to managing battery charging based on battery powered device usage.

BACKGROUND

Battery powered devices are becoming increasingly power efficient, allowing for more time to pass before the batteries run out of charge. Users of these devices often keep backup batteries ready for swapping at a moment's notice in order to minimize downtime. However, user demand for fully charged backup batteries may result in keeping the batteries topped off at their highest voltage over extended periods of time, even after charging has completed. These backup batteries may be charging for weeks or months, regardless of the actual time required to fully charge the battery (e.g., several hours). Keeping these backup batteries fully charged for extended periods is detrimental to battery performance.

Battery protection measures which involve passive discharging often result in a backup battery which is not fully charged when the user needs it. Instead, the user either uses the backup battery in its current suboptimal state, or overrides the protection measures and forces the charger to fully charge the backup battery. As a result, either the backup battery does not provide optimal performance (thereby failing earlier than expected), or device downtime is extended while the backup battery is being fully charged (thereby preventing uninterrupted device operation).

Further, large capacity batteries and batteries designed for low rate self discharging may take weeks to months to reach discharge thresholds. Thus, these batteries may stay in a high voltage state for prolonged periods of time even while discharging. Therefore, passive discharging would not prevent performance issues in these scenarios.

If a user checks the status of a backup battery that has passively discharged, the backup battery may not be 100% charged at the time of the status check. As a result, the user may be confused as to why a backup battery is not fully charged and may replace the battery or the charger as a result.

SUMMARY

This disclosure describes implementations of systems and devices with improved methods for long term battery management. In some implementations, a battery charging system is designed for active interactions between a removable battery docked in a charging base (referred to herein as a "charging battery") and another removable battery installed in and powering a battery powered device (referred to herein as an "in-use battery"). In some implementations, a server system (e.g., a cloud server) learns about battery drain and charging (e.g., based on user usage patterns) and notifies a user when it is time to swap the in-use battery with the charging battery. The battery charging system controls battery state-of-charge (SOC) and maintains battery state-of-health (SOH) based on a user demand profile and/or device usage characteristics. Such maintenance extends battery longevity and provides extended safety, reliability, and performance of the batteries.

In one aspect, some implementations include a method performed at a battery charging device that includes one or more processors and memory, the method including receiving battery life information for a first battery (in-use battery) in use in an electronic device, receiving user demand information for the electronic device, and based on the battery life information and/or the user demand information, adjusting a charging rate for a second battery (charging battery) electrically coupled to the battery charging device, the second battery configured for use in the electronic device.

In another aspect, some implementations include a method performed at a server system that includes one or more processors and memory, the method comprising receiving battery life information for a first battery (in-use battery) in use in an electronic device, receiving user demand information for the electronic device, and based on the battery life information and/or the user demand information, sending charging rate information to a battery charging device for a second battery (charging battery) electrically coupled to the battery charging device, the second battery configured for use in the electronic device.

In some implementations, the battery life information indicates that the first battery will deplete by a particular time, and adjusting the charging rate includes setting the charging rate so that the second battery will be fully charged by the particular time.

In some implementations, the user demand information is associated with a user of the electronic device and indicates a predicted usage of the electronic device by the user, a user desire to install the second battery in the electronic device at a particular time, and/or information indicating that a user will be away from the electronic device during a particular time period, and adjusting the charging rate includes setting the charging rate so that the second battery will be fully charged in accordance with the predicted usage, the particular time, and/or the particular time period.

In some implementations, a battery charger is utilized to adjust battery charging rates based on information about the user and one or more of the batteries currently in use. Such a battery charger empowers a user to understand (a) battery health and (b) how to prepare batteries for long term charging and/or storage. Such a battery charger also empowers seamless use of battery powered devices, which is important to many users, particularly in security applications (such as security cameras) where downtime is critical to avoid.

The battery chargers described herein improve safety, reliability, performance, and cost associated with maintaining batteries. The ability to regulate and control battery state-of-charge (SOC) for state-of-health (SOH) reduces the risk posed by batteries at their highest energy state. Maintaining batteries within a preferred charge state (e.g., less than 70%, 80%, or 90% of full charge) reduces battery wear and improves performance by enabling a longer lasting and more durable battery. In addition, extended battery longevity saves a user the costs associated with disposing of failed batteries and purchasing new replacement batteries.

Thus, systems and devices are provided with more accurate and effective methods for managing batteries, thereby increasing the accuracy, effectiveness, efficiency, and user satisfaction with such devices.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 5A-5B illustrate example battery notifications in accordance with some implementations.

FIGS. 8A-8B illustrate representative tables for battery and device management in accordance with some implementations.

Like reference numerals refer to corresponding parts throughout the several views of the drawings.

DETAILED DESCRIPTION

Battery powered electronic devices may operate for days, weeks, or months before the battery is fully drained. For example, a battery powered camera may operate in a low power mode (e.g., a motion-activated mode) that enables the camera to operate for weeks or months before the battery is drained. It is beneficial for users of such devices to have a replacement battery on hand to swap with a drained battery (or one that is close to being drained) so that device downtime is minimized. However, maintaining the replacement battery at full charge for days, weeks, or months can be damaging to the battery, increasing the likelihood of reduced performance or failure. A battery charging device, such as a device that communicates with (i) a user device, (ii) the battery powered electronic device, or (iii) the in-use battery, can adjust a charging rate of the replacement battery so that it is fully charged only when a replacement is imminent. The battery charging device may use information from a variety of sources to accurately predict when a replacement is needed. For example, the battery charging device may receive current battery life information from the in-use battery and/or from the electronic device. The charging device may also receive schedule and use information (referred to herein as user demand information) from the user or from the electronic device that will impact how quickly the in-use battery is drained. The charging device may also receive user demand information in the form of user preference information such as how low the user prefers the in-use battery to drain before swapping in the replacement battery. Alternatively, a server (e.g., a cloud server) may receive the battery life information and/or the user demand information and send corresponding instructions to the charging device.

Figure 1A:
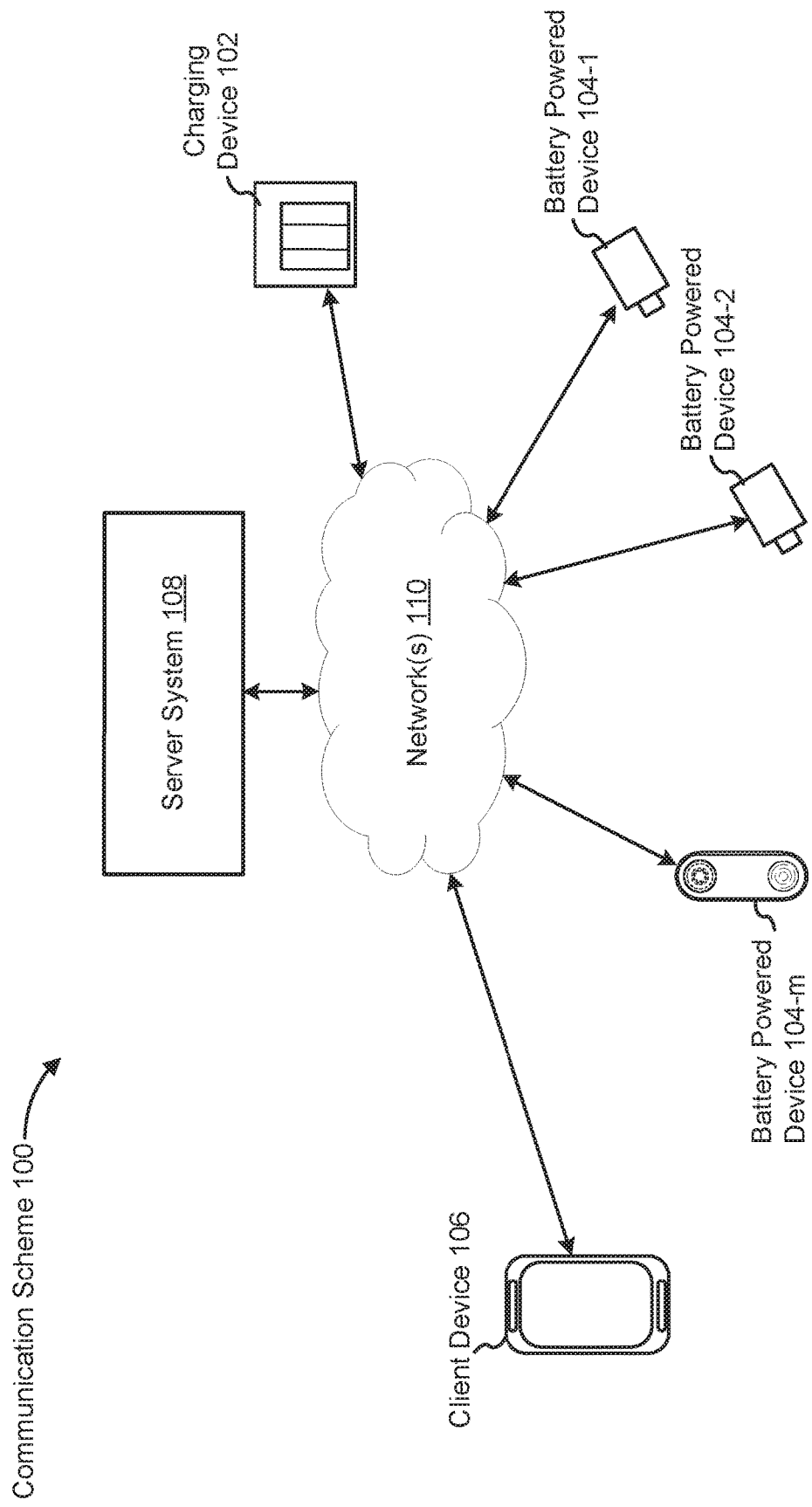
FIGS. 1A-1B illustrate representative communication schemes for battery systems in accordance with some implementations.
Figure 1B:
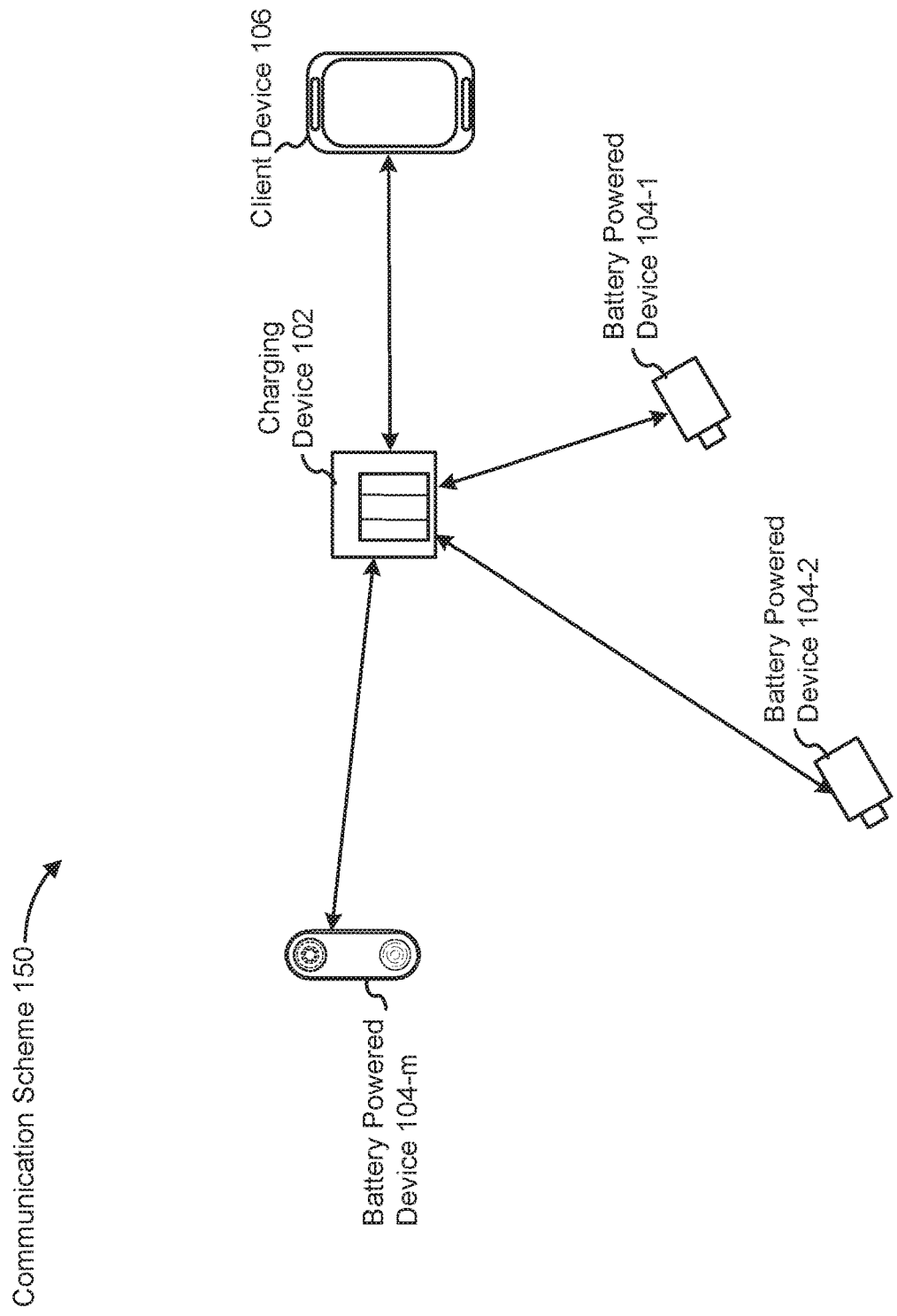

FIGS. 1A-1B illustrate representative communication schemes for battery systems in accordance with some implementations. In these communication schemes, the charging device 102 may be in communication with a variety of electronic battery powered devices 104 and a user (via a client device 106) via communications relayed through a server system 108 (FIG. 1A) and/or via device-to-device connections (FIG. 1B). For example, a battery powered electronic device and the charging device both communicate battery life information (e.g., state-of-charge (SOC) information) to a cloud server. In this example, the cloud server computes and provides status information to the user (e.g., via an application on the user's client device 106). The client device 106 may be a mobile phone, tablet computer, laptop computer, desktop computer, or any type of computing device accessible to a user. The server system 108 may be a cloud server, local server, or any type of computing system capable of communicating with one or more charging devices 102 and one or more battery powered devices 104.

In some implementations, a device having a battery (such as a charging device 102 or a battery powered device 104) includes an integrated state-of-charge chip (e.g., an onboard fuel gauge chip) and communication circuitry. The battery communicates information, such as state-of-charge information, battery voltage values, battery temperature values, and/or battery current values. In some implementations, the battery is coupled to or otherwise includes measurement and/or maintenance circuitry that provides charge measurement, over-voltage protection, and/or other features. In some implementations, a device that includes a battery (such as a charging device 102 or a battery powered device 104) reads measurement and/or maintenance values from the measurement and/or maintenance circuitry, and communication circuitry which is directly or indirectly coupled to the measurement and/or maintenance circuitry communicates the measurement and/or maintenance values to other devices (e.g., charging device(s) 102, battery powered device(s) 104, client device(s) 106) and/or to a server system 108.

FIG. 1A shows a communication scheme 100 in which a charging device 102 is communicatively coupled to various battery powered devices 104-1 through 104-$m$ (e.g., camera(s), doorbell(s) with or without camera(s), thermostat(s)), a server system 108, and a client device 106 via one or more network(s) 110. In some implementations, the charging device 102 is coupled to the network(s) 110 via one or more wireless protocols, such as Wi-Fi.

FIG. 1B shows a communication scheme 150 in which a charging device 102 is directly communicatively coupled to the various battery powered devices 104-1 through 104-$m$ (e.g., camera(s), doorbell(s) with or without camera(s), thermostat(s)) and the client device 106. In some implementations, the charging device 102 is coupled to the other devices via one or more device-to-device protocols, such as Bluetooth.

In some implementations, the charging device 102 is coupled to the other devices via one or more direct connections and one or more network connections (e.g., a combination of the schemes 100 and 150 shown in FIGS. 1A-1B). In some implementations, the charging device 102 is coupled to the server system 108 and receives information, such as charging instructions and/or the information from other devices, from the server system 108. In some implementations, the charging device 102 is communicatively coupled to other battery powered devices not shown in FIGS. 1A-1B, such as one or more battery powered doorbells, battery powered hazard detectors, battery backup devices (such as a battery backup for a home security system or personal computer), battery powered power tools, electric scooters, personal computers, mobile phones, and the like.

Figure 2A:
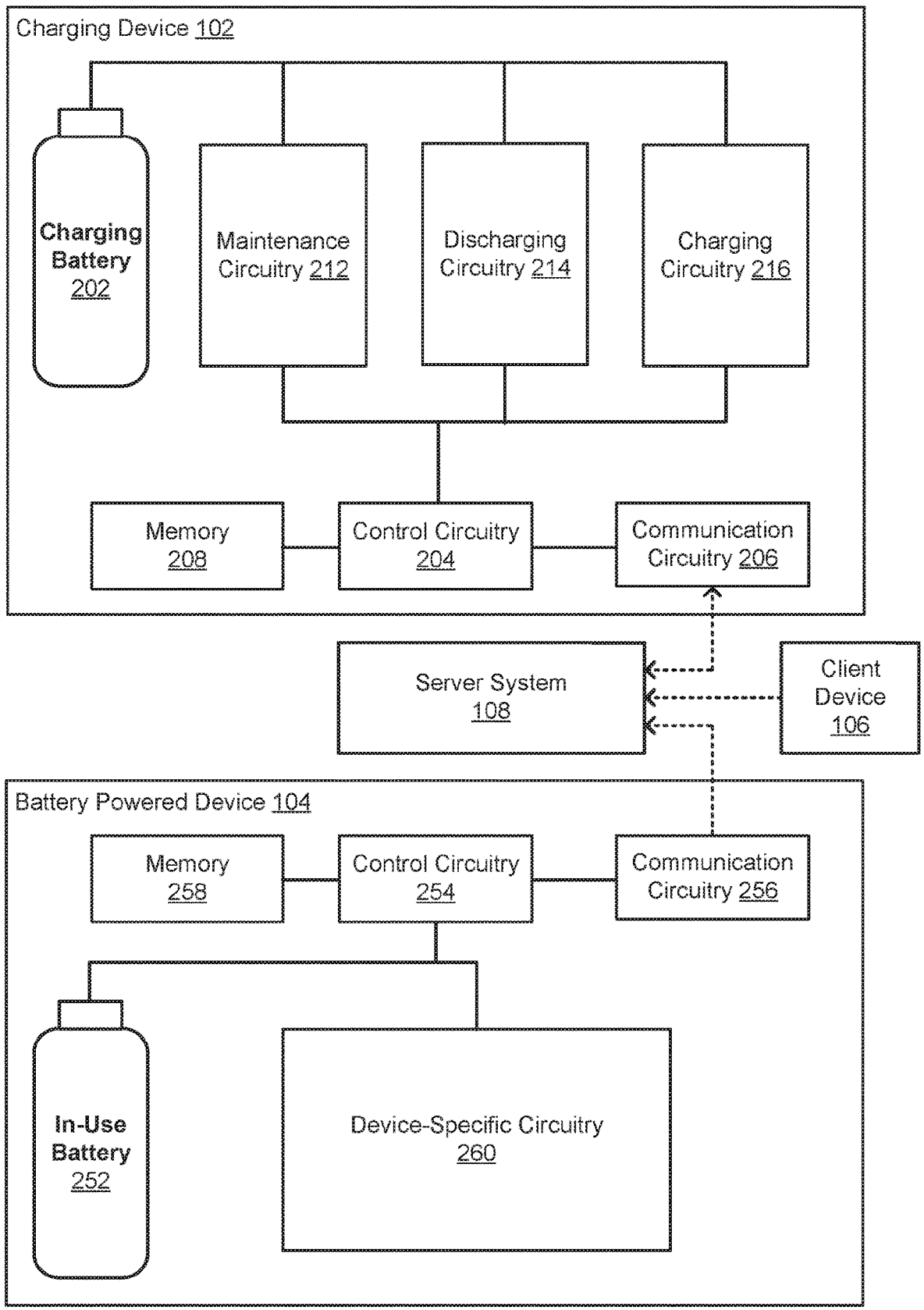
FIGS. 2A-2B are block diagrams illustrating a representative charging device in accordance with some implementations.
Figure 2B:
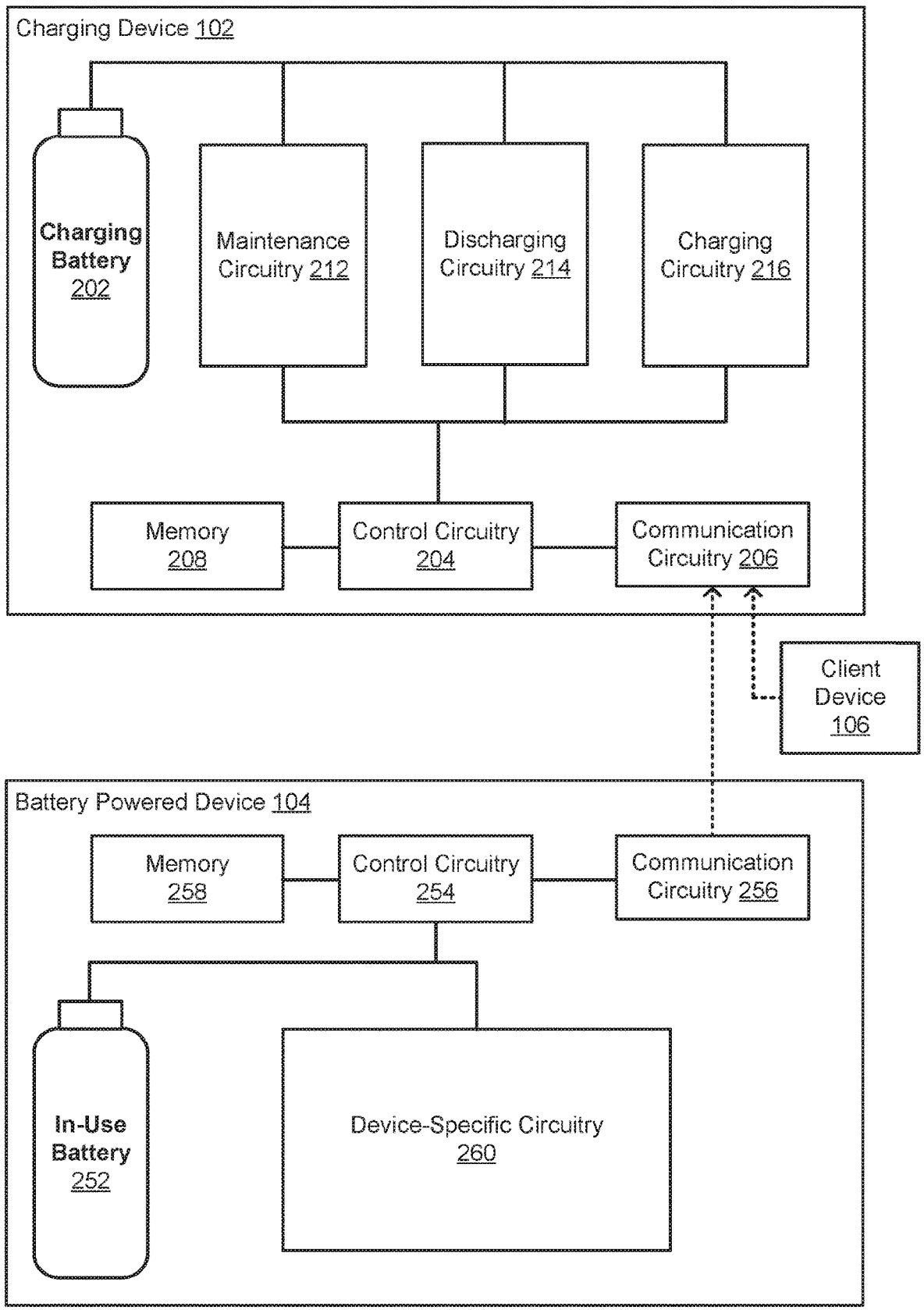

FIGS. 2A-2B are block diagrams illustrating a charging device 102, a battery powered device 104, and a client device 106 in accordance with some implementations. In FIG. 2A, the charging device 102 is communicatively coupled to the battery powered device 104 and the client device 106 through a server system 108 (as described with reference to FIG. 1A). In FIG. 2B, the charging device 102 is directly communicatively coupled to the battery powered device 104 and the client device 106 (as described with reference to FIG. 1B).

In some implementations, the charging device 102 is configured to charge, and optionally discharge, a battery (or battery pack) 202. In some implementations, the battery 202 is configured for use in other battery powered devices 104 (e.g., configured for swapping with in-use battery 252). In accordance with some implementations, the charging device 102 includes control circuitry 204 (e.g., one or more processors) communicatively coupled with memory 208, communication circuitry 206, maintenance circuitry 212, discharging circuitry 214, and charging circuitry 216. In some implementations, the charging device 102 is configured to charge a variety of battery types (e.g., with varying chemistries, characteristics, specifications, and form factors).

In some implementations, the communication circuitry 206 includes components for communicating with one or more remote electronic battery powered devices 104 and/or computing systems (e.g., server system 108 and/or client device 106). In some implementations, the communication circuitry 256 includes components for communicating with one or more charging devices 102 and/or computing systems (e.g., server system 108 and/or client device 106). In some implementations, the communication circuitry 206 and 256 includes one or more components for wireless communication (e.g., one or more antennas and/or transceivers) and/or one or more components for wired communication.

The communication circuitry 206 and 256 includes, for example, hardware capable of data communications using any of a variety of custom or standard wireless protocols (e.g., IEEE 402.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some implementations, the communication circuitry 206 and 256 includes one or more radios. In some implementations, the radios enable one or more radio communication networks in an Internet of things (IOT) environment, and enable charging device(s) 102 and battery powered device(s) 104 to communicate with other devices. In some implementations, the radios are capable of data communications using any of a variety of custom or standard wireless protocols (e.g., IEEE 402.15.4, Wi-Fi, ZigBee, 6LoWPAN, Thread, Z-Wave, Bluetooth Smart, ISA100.5A, WirelessHART, MiWi, etc.).

In some implementations, memories 208 and 258 include high-speed random access memory, such as DRAM, SRAM, DDR RAM, or other random access solid state memory devices; and, optionally, include non-volatile memory, such as one or more magnetic disk storage devices, one or more optical disk storage devices, one or more flash memory devices, or one or more other non-volatile solid state storage devices. The memories 208 and 258, or alternatively the respective non-volatile memory within the memories 208 and 258, include respective non-transitory computer-readable storage mediums. In some implementations, the memories 208 and 258, or the respective non-transitory computer-readable storage mediums of the memories 208 and 258, store battery data such as state-of-charge information, battery health information, battery temperature information, battery location information, battery usage information, and the like (e.g., including battery management table 800, FIG. 8A, and/or device management table 810, FIG. 8B).

In some implementations, the maintenance circuitry 212 includes components for measuring characteristics of the batteries 202 (e.g., during charging and discharging), such as voltage levels, current levels, impedance levels, and the like. In some implementations, the maintenance circuitry 212 includes one or more sensors for determining status of the batteries 202, such as a temperature sensor to determine an operating temperature of the batteries 202.

In some implementations, the discharging circuitry 214 includes components for discharging batteries 202. In some implementations, the discharging circuitry 214 includes components for discharging a variety of battery types (e.g., based on the chemistry of each battery type). In some implementations, the discharging circuitry 214 includes one or more resistors, diodes, or other elements configured to drain charge from the batteries 202. In some implementations, the discharging circuitry 214 includes one or more light emitting diodes (LEDs) for discharging the batteries 202 and providing feedback to a user of the charging device 102. In some implementations, the charging device 102 does not include the discharging circuitry 214, but rather utilizes self discharge functions of the batteries 202 to discharge the batteries.

In some implementations, the charging circuitry 216 includes components for charging batteries 202. In some implementations, the charging circuitry 216 includes components for charging a variety of battery types (e.g., based on the chemistry of each battery type).

In some implementations, the control circuitry 204 includes one or more processing units (also referred to as processors, microprocessors, and central processing units) which govern charging and discharging of the batteries 202 (e.g., based on information received from the communication circuitry 206 and/or the maintenance circuitry 212). In some implementations, the charging device 102 further includes a switching component and the control circuitry 204 controls the switching component to govern which of the charging, discharging, and maintenance circuits are coupled to the batteries 202 at a given time.

In some implementations, the control circuitry 254 includes one or more processing units (also referred to as processors, microprocessors, and central processing units) which govern device-specific operations of the battery powered device 104. The battery powered device 104 also includes device-specific circuitry 260 for executing the device-specific operations. For example, if the battery powered device 104 is a camera, the device-specific circuitry 260 may include image processing circuitry governed by models stored in memory 258 and executed by control circuitry 254. The control circuitry 254 is configured to process communications received by communication circuitry 256 (e.g., requests for battery life information of one or more in-use batteries 252). The control circuitry 254 is further configured to govern battery monitoring circuitry (not shown) in order to respond to battery life information requests (e.g., by obtaining battery life information of an in-use battery 252 and causing the battery life information to be transmitted to a charging device 102 through communication circuitry 256).

Figure 3:
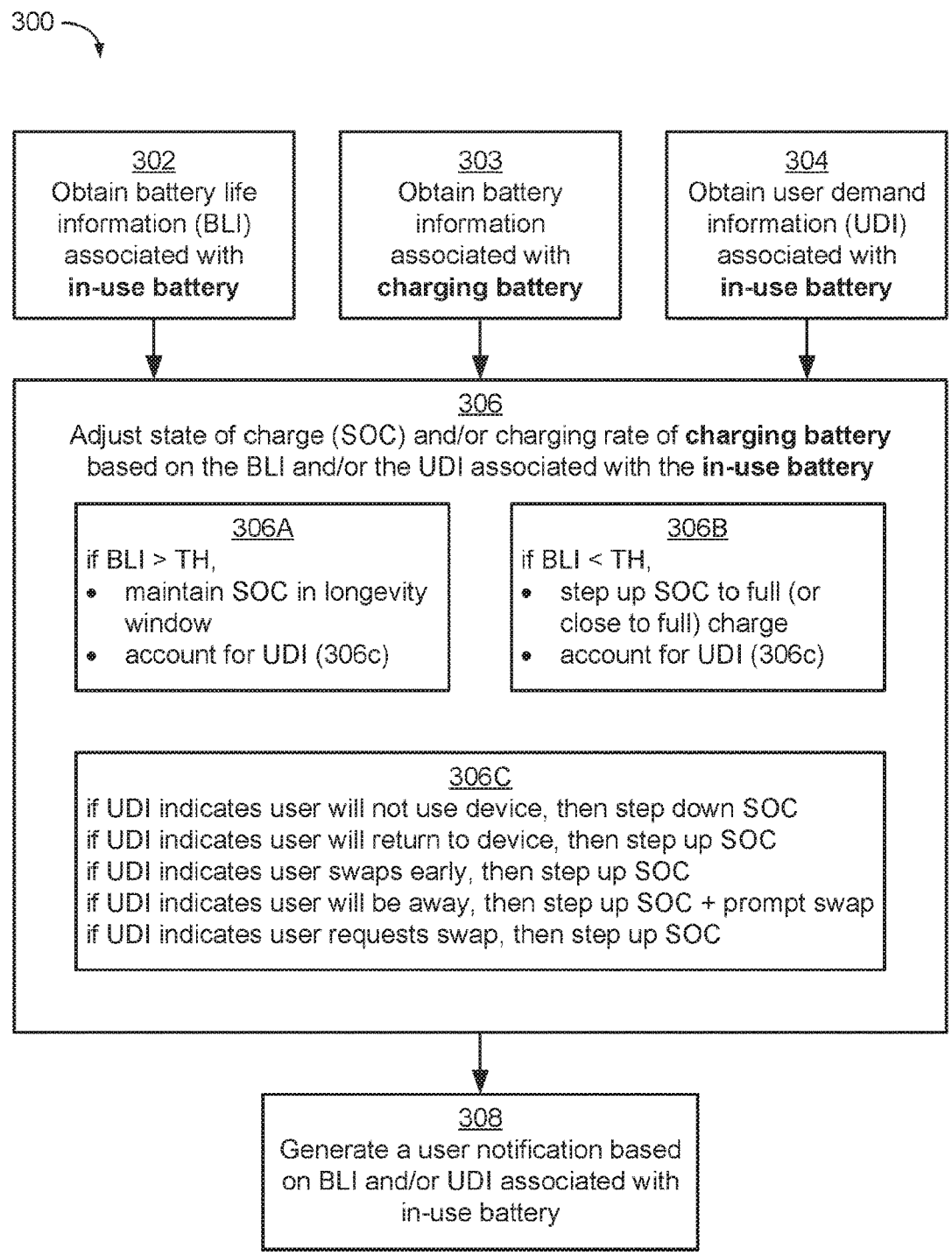
FIG. 3 is a flow diagram illustrating an example charging process for battery systems in accordance with some implementations.

FIG. 3 is a flow diagram illustrating a method 300 of battery management in accordance with some implementations. In some implementations, the method 300 is performed by a charging device (e.g., a charging device 102), an electronic device (e.g., a battery powered device 104), a client device (e.g., the client device 106), and/or a server system (e.g., the server system 108). In some implementations, the operations of the method 300 described herein are interchangeable, and respective operations of the method 300 are performed by any of the aforementioned devices or systems. In some implementations, the method 300 is governed by instructions that are stored in a non-transitory computer-readable storage medium and that is executed by one or more processors or controllers of a device, such as the control circuitry 204 and 254. For convenience, the method 300 is described below as being performed by a battery management system (e.g., a system that includes a battery charging device, one or more battery powered electronic devices, and/or a server).

Referring to method 300 of FIG. 3, the battery management system obtains (302) battery life information (BLI) associated with a first battery, such as a battery being used in a battery powered electronic device (e.g., in-use battery 252, battery powered device 104).

In some implementations, the battery management system obtains the BLI by sending a request to a battery powered device to acquire the BLI. For example, the server system 108 or the battery charging device 102 sends the request to the battery powered device 104. In some implementations, the battery powered device is a battery powered device 104. For example, the battery powered device is a camera, hazard detector, doorbell, display, assistant device, or security device. In some implementations, the request is sent via one or more networks (e.g., network(s) 110, FIG. 1A). In some implementations, the request is sent via device-to-device communication (e.g., as illustrated in FIG. 1B). In some implementations, the battery or the battery powered device using the battery receives the request and responds by sending BLI to the battery management system. In some implementations, the battery or the battery powered device using the battery includes communication circuitry (e.g., 256), control circuitry (e.g., 254), memory (e.g., 258), and control circuitry (e.g., 254). In some implementations, the control circuitry includes diagnostic circuitry configured to determine battery charging and/or discharging characteristics.

In some implementations, the BLI is sent in response to the request. In some implementations, the BLI includes state-of-charge and/or state-of-health information for the in-use battery. In some implementations, the BLI is relayed to the battery management system via one or more networks and/or one or more server systems. For example, the BLI is sent from the battery powered device to a server system (e.g., server system 108) via one or more networks and then is sent from the server system to a charging device (e.g., charging device 102).

In some implementations, the BLI is received from a server system communicatively coupled to the battery powered device. In some implementations, the battery powered device uploads the BLI as part of an event notification or other status report with the server. In some implementations, the battery powered device routinely (periodically) uploads the BLI to a server system and/or charging device. In some implementations, the battery charging device includes a wireless radio component (e.g., communication circuitry 206, FIGS. 2A-2B), and the BLI is received via the wireless radio component. In some implementations, the BLI is stored by the battery management system (e.g., in memory 208 and/or memory in the server system 108 or client device 106). In some implementations, the BLI is utilized to update one or more tables maintained by the battery management system (e.g., the battery management table 800 and/or the device management table 810 described below with reference to FIGS. 8A and 8B).

Referring back to method 300 of FIG. 3, the battery management system obtains (303) battery information for a second battery, such as a charging battery that is electrically coupled to a battery charging device (e.g., charging battery 202, charging device 102), where the charging battery is configured for use in the battery powered device. In some implementations, at least a portion of the battery information for the charging battery is obtained from the charging battery. In some implementations, the charging battery sends at least a portion of the battery information to the battery management system. In some implementations, the battery charging device generates the battery information for the charging battery based on charging/discharging of the charging battery (e.g., as measured by the maintenance circuitry 212, FIGS. 2A-2B). In some implementations, the battery information includes at least one of: charge capacity information, voltage level information, temperature information, and optimal charge range information. In some implementations, the battery information includes state-of-charge information and/or state-of-health information for the charging battery. In some implementations, the battery information is stored by the battery management system (e.g., in memory 208 and/or memory in the server system 108 or client device 106).

In some implementations, the battery management system uses the battery information of the charging battery to update one or more tables maintained by the battery management system (e.g., the battery management table 800 and/or the device management table 810 described below with reference to FIGS. 8A and 8B). In some implementations, at least a portion of the battery information for the charging battery is determined based on monitoring charging and discharging of the charging battery (e.g., monitored by a charging device 102 and/or a battery powered device 104). In some implementations, the battery management system (e.g., a charging device 102) performs a maintenance routine (e.g., utilizing the maintenance circuitry 212) with charging and discharging phases on the charging battery to obtain at least a portion of the battery information. In some implementations, the maintenance routine is performed periodically (e.g., once per day, once per week, once per month). In some implementations, the maintenance routine is performed in accordance with a battery being docked to the battery charging device. In some implementations, the battery management system maintains a battery characterization table (e.g., battery management table 800, described below with reference to FIG. 8A), the battery characterization table including a first entry for the in-use battery and a second entry for the charging battery. In some implementations, the battery management system updates the first entry based on the BLI of the in-use battery and updates the second entry based on the battery information for the charging battery. In some implementations, the battery management system makes a battery health determination and, if needed, recommends disposal of old batteries and purchase of new batteries. In some implementations, the battery characterization table is stored at the charging device and/or a server system.

Referring back to method 300 of FIG. 3, the battery management system obtains (304) user demand information (UDI) associated with the in-use battery, or associated with a battery powered device being powered by the in-use battery. In some implementations, the UDI is included in a notification from a user (e.g., via client device 106) of the battery powered device.

The notification includes one or more of user schedule information, user calendar information, and/or information indicating a predicted usage of the battery powered device by the user (e.g., the user indicates he or she will be going on vacation and not using the device). In some implementations, the battery management system receives UDI in response to the user setting or updating one or more of a battery replacement schedule, a device priority, a user event, and/or a user calendar (e.g., affordances 706-712 described below with reference to FIG. 7).

In some implementations, the UDI includes user habit information, such as whether the user habitually changes batteries when 0%, 10%, or 30% of charge remains. In some implementations, the UDI includes user preferences, such as a preference to change batteries at 30%, 20%, or 10% of remaining charge. In some implementations, the UDI is obtained by storing information related to the user's response to prior battery notifications and remaining charge levels when the user previously swapped batteries. In these implementations, the battery management system causes (306) the charging battery's state of charge to be stepped up so that it is fully charged by the time the user swaps the batteries (e.g., if the habit or preference information indicates the user will return to the battery powered device at a certain time, or if the habit or preference information indicates that the user is likely to swap the batteries early). On the other hand, the battery management system causes the charging battery's state of charge to be stepped down to preserve battery performance if, for example, the habit or preference information indicates that the user will not use the battery powered device for a certain amount of time.

In some implementations, the UDI indicates a user will be away from the battery powered device 104 during a particular time period, and the battery management system sends a notification to the user to swap the in-use and charging batteries prior to the particular time period. For example, the user indicates that he or she will be going on vacation and is prompted to swap the batteries before leaving (e.g., so that the in-use battery is not fully depleted while the user is away). In these implementations, the battery management system causes (306) the charging battery's state of charge to be stepped up so that it is fully charged by the time the user receives the prompt to swap the batteries.

In some implementations, the UDI indicates a user desire to install the charging battery in the battery powered device 104 at a particular time (e.g., the user requests a swap). For example, the UDI is sent in response to the user setting or updating a battery replacement schedule that includes the in-use battery and/or charging battery. In these implementations, the battery management system causes (306) the charging battery's state of charge to be stepped up so that it is fully charged by the particular time, or by a replacement time indicated by the battery replacement schedule.

Referring back to method 300 of FIG. 3, the battery management system adjusts (306) the state of charge and/or the charging rate of the charging battery based on the BLI and/or the UDI associated with the in-use battery. For example, if the BLI of the in-use battery (e.g., in-use battery depletion time or state of charge) is over a threshold (306A), the battery management system maintains the state of charge of the charging battery in a longevity window (e.g., preferred range 402 as described below with reference to FIG. 4A). On the other hand, if the BLI of the in-use battery (e.g., in-use battery depletion time or state of charge) is less than a threshold (306B), the battery management system steps up the state of charge of the charging battery so that the charging battery is fully charged, or close to fully charged (e.g., the charge level of Battery 2 between times $T_2$ and $T_3$ as described below with reference to FIG. 4A).

In some implementations, in operations 306A and 306B, the battery management system accounts for the UDI associated with the in-use battery (306C). For example, if the BLI is above a threshold (306A) the battery management system may bring the charging battery out of the longevity window and step up the state of charge if the UDI indicates a user is likely to swap batteries before the BLI of the in-use battery has a chance to drop below the threshold (306B). Likewise, if the BLI is below a threshold (306B), the battery management system may bring the state of charge of the charging battery back down to the longevity window if the UDI indicates the user will not use the device for a relatively long time (e.g., for more than a threshold amount of time). That way, the charging battery is not kept fully charged for an unnecessary amount of time.

In some implementations, adjusting the charging rate includes ceasing to charge the charging battery (e.g., in accordance with a determination that the in-use battery will not deplete within a predetermined amount of time, such as 3 days, 1 week, 2 weeks, or 1 month). In some implementations, adjusting the charging rate includes discharging the charging battery (e.g., to bring it back into a preferred charge range for long-term storage). In some implementations, the charging rate is adjusted based on an amount of charge in the in-use battery and/or a rate of depletion of the in-use battery (e.g., as illustrated below in FIGS. 4A-4C). In some implementations, the charging rate is based on a temperature of the battery. In some implementations, the battery management system ensures that the charging rate complies with relevant safety standards, such as Japan Electronics and Information Technology Industries Association (JEITA) standards.

In some implementations, the BLI indicates that the in-use battery will deplete by a particular time (e.g., BLI is less than a threshold, as in operation 306B). As such, the battery management system sets the charging rate (steps up the state of charge) so that the charging battery will be fully charged by or at the particular time. In some implementations, the charging rate is set so that the charging battery will be fully charged at a preset time in advance of depletion of the in-use battery. For example, the charging battery is charged so that it will be fully charged 1 hour, 1 day, or 3 days before the in-use battery depletes. In some implementations, the preset time is based on the UDI such as user preferences (e.g., how soon before depletion does the user prefer to swap batteries) and user history (e.g., on average how soon before depletion has the user historically swapped batteries).

In some implementations, fully charged means above a predetermined threshold amount of charge (e.g., greater than 80%, 90%, or 95%) of the battery's current charge capacity. For example, a battery is considered to be fully charged if it is within 10% of its maximum charge capacity (which may decrease with use and time). In some implementations, depleted means below a predetermined threshold amount of charge (e.g., less than 20%, 10%, or 5%) of the battery's charge capacity. For example, a battery is considered to be depleted if it has less than 10% of its maximum charge capacity. In some implementations, the BLI indicates that the in-use battery will deplete at the particular time. In some implementations, the charging rate is adjusted so that the charging battery will be fully charged at the particular time.

In some implementations, the BLI indicates an estimated depletion time for the in-use battery, and if the depletion time is over a threshold (306A), the battery management system maintains the charging battery at a charge level in a longevity window (e.g., below a predefined threshold and/or within a preferred charge range) until a predefined amount of time before the estimated depletion time (e.g., until 5 hours, 12 hours, or 2 days before the estimated depletion time). Once the predefined amount of time before the estimated depletion time is less than a threshold amount (306B), the battery management system steps up the state of charge of the charging battery (e.g., as illustrated below in FIGS. 4A-4C).

In some implementations, the BLI indicates a time period for depletion of the in-use battery (or the battery management system determines a time period for depletion of the in-use battery based on the BLI). In accordance with a determination that the time period for depletion exceeds a predetermined amount of time (e.g., exceeds 1 day, 5 days, 2 weeks, or 1 month) (306A), the battery management system forgoes charging the charging battery. In some implementations, in accordance with a determination that the time period for depletion does not exceed the predetermined amount of time (306B), the battery management system charges the charging battery at a rate sufficient to fully charge the battery by the end of the time period for depletion.

In some implementations, the battery information of the charging battery indicates a current charge level for the charging battery (or the battery management system obtains a current charge level for the charging battery based on the battery information associated with the charging battery). In accordance with a determination that the current charge level of the charging battery exceeds a predefined threshold charge amount and a determination that the time period for depletion of the in-use battery exceeds the predetermined amount of time (306A), the battery management system actively drains charge from the charging battery (e.g., utilizing discharging circuitry 214, FIGS. 2A-2B) to that required for maintaining the longevity window. In some implementations, actively draining charge comprises electrically coupling the charging battery to a transistor and/or resistor to discharge the battery. In some implementations, actively draining charge comprises electrically coupling the charging battery to an LED of the charging device. In some implementations, the charging battery is passively discharged (e.g., the charging battery is discharged via a self discharge mechanism of the charging battery). In some implementations, the predefined threshold charge amount is based on a chemistry of the charging battery.

In some implementations, the battery management system generates (308) a user notification (e.g., a notification 504, 550, 552, or 554, FIGS. 5A-5B) based on the BLI and/or the UDI associated with the in-use battery. In some embodiments, the user notification includes an estimated depletion time for the in-use battery. In various implementations, the user notification is generated by the battery powered device, the server system, or the battery charging device. In some implementations, the user notification is, or includes, at least one of: an SMS, a calendar event, an alert in an assistant application, and an email. In some implementations, the user notification is displayed within a battery life user interface (e.g., the user interfaces 600 and/or 700 as described below with reference to, FIGS. 6A-6B and 7) indicating a battery charge level of the in-use battery.

In some implementations, the battery management system receives BLI for a second in-use battery (a battery in use in a second battery powered device), and adjusts the charging rate for the charging battery based on the BLI of the first in-use battery and the BLI of the second in-use battery. In these implementations, the battery management system manages multiple batteries in use in multiple battery powered devices (e.g., as described below with reference to FIGS. 4C, 6A-6B, 7, and 8A-8B). For example, the user has two battery powered cameras, a battery powered doorbell, and a battery powered smoke detector that all use the same type of batteries. In this example, the user also has a battery charger and a spare battery. In accordance with some implementations, the battery management system tracks the charge levels of the in-use batteries and charges the spare battery accordingly. In this example, the battery management system notifies the user when one of the battery powered devices is in need of a battery swap (e.g., 20%, 10%, or 5% of full charge remaining). In some implementations, the BLI of the first in-use battery indicates a first depletion time and the BLI of the second in-use battery indicates a second depletion time, and the charging rate of the charging battery is adjusted so as to fully charge the charging battery before the first or second depletion times.

Figure 4A:
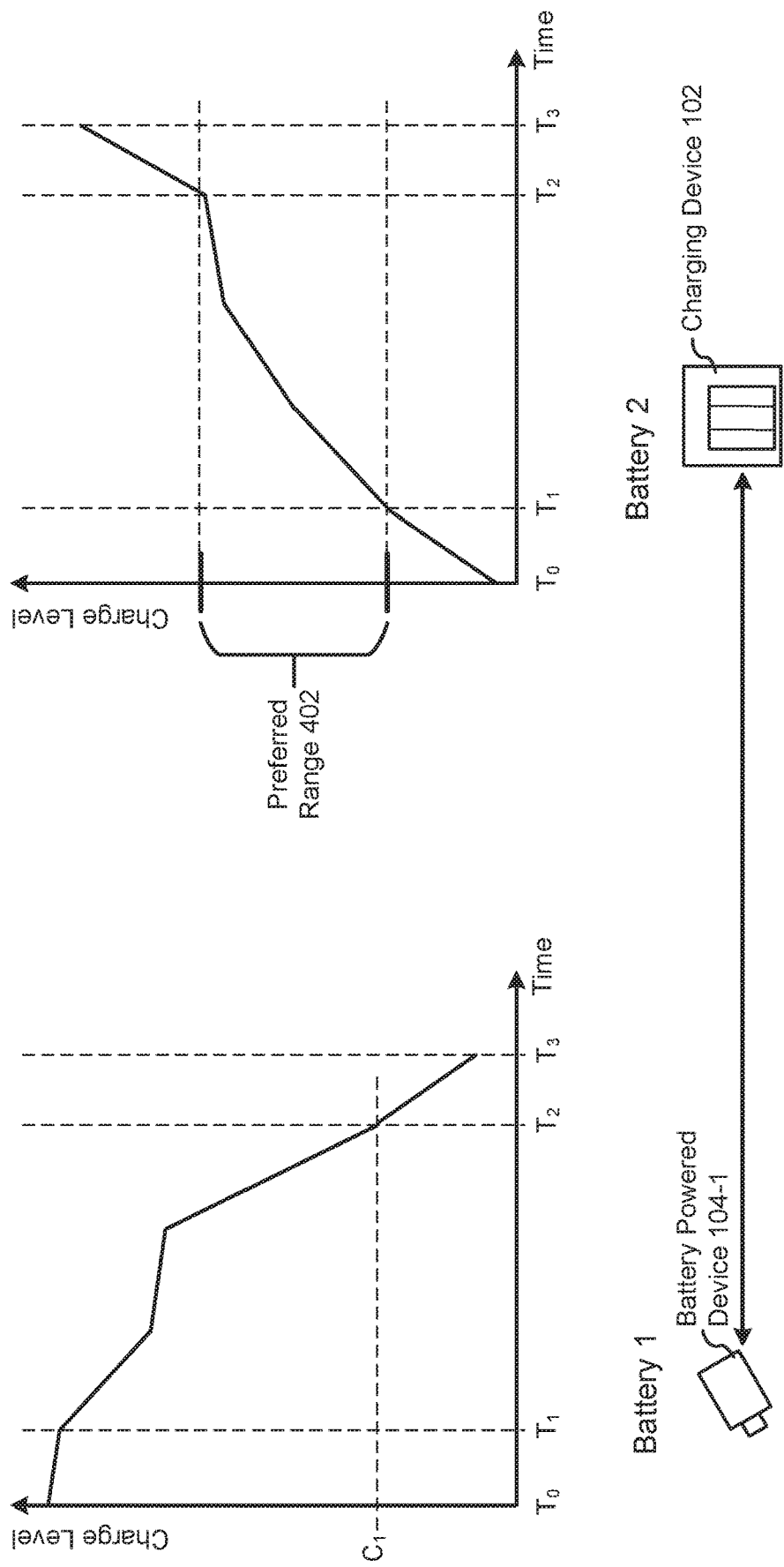
FIGS. 4A-4C illustrate example charging sequences for battery systems in accordance with some implementations.
Figure 4B:
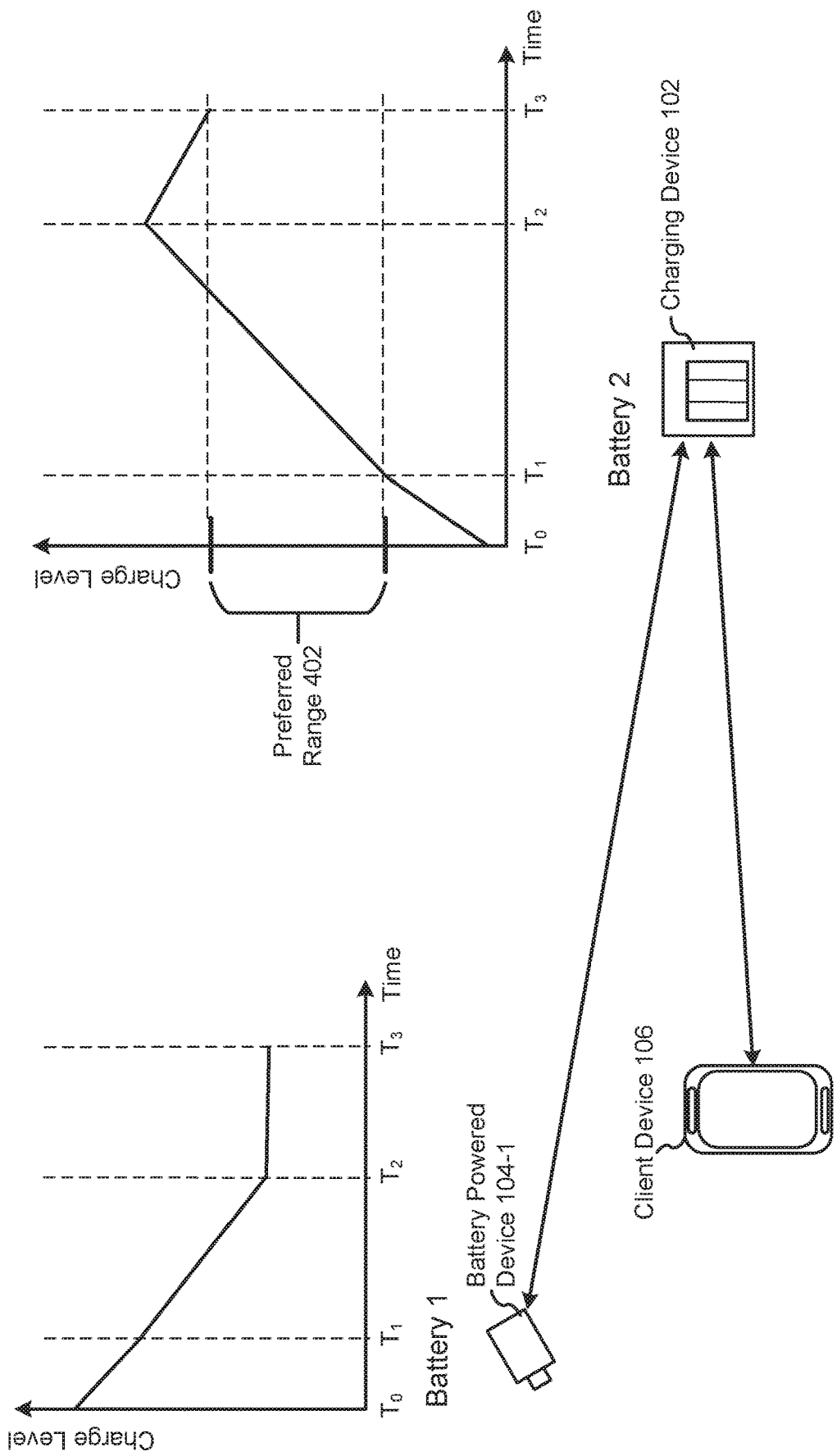
Figure 4C:
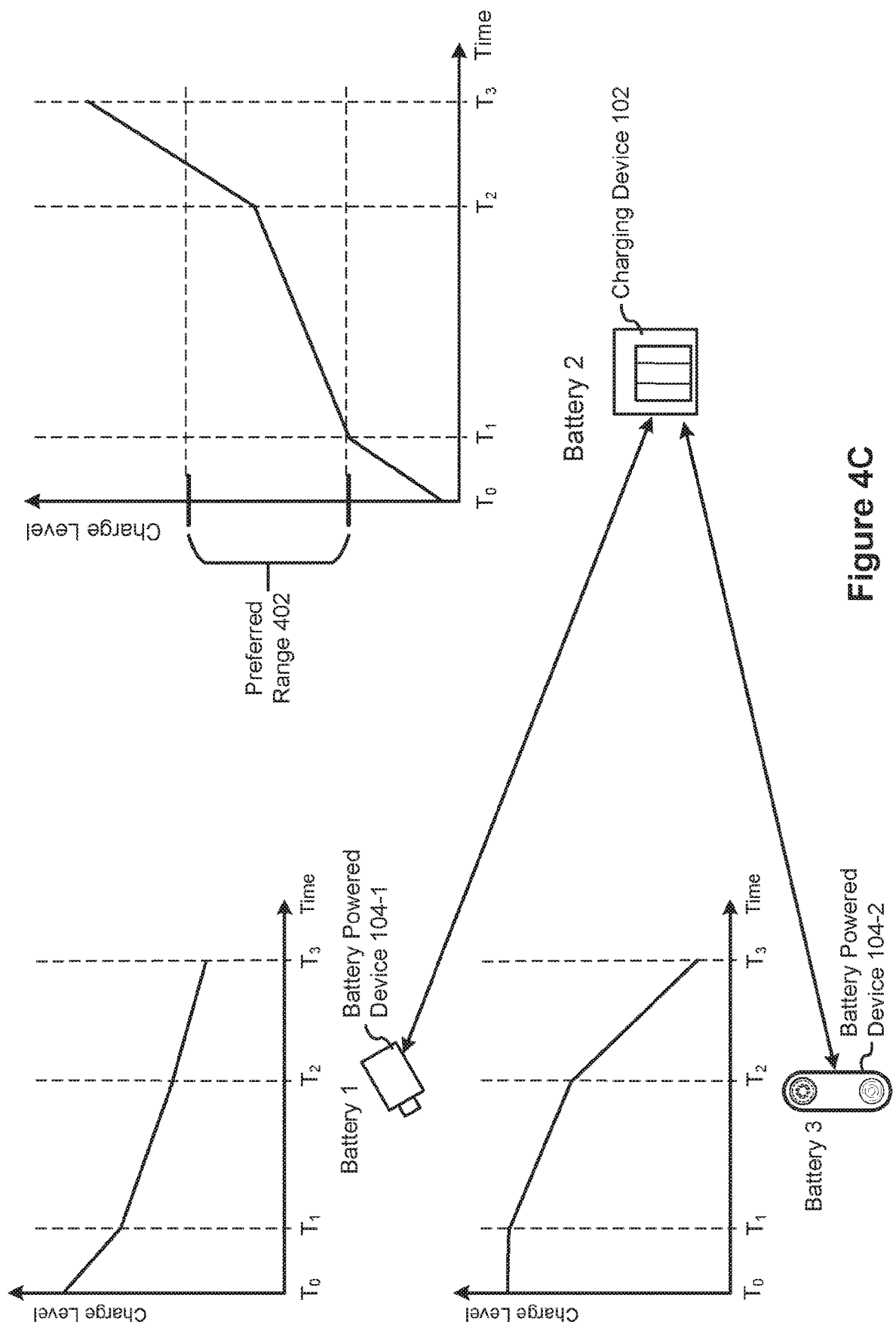

FIGS. 4A-4C illustrate example charging sequences for battery systems in accordance with some implementations. In FIG. 4A, the charging device 102 is electrically coupled to battery 2 and is in communication with the battery powered device 104-1 using battery 1. In accordance with some implementations, the charging device 102 is adjusting charging rates for battery 2 based on battery information of battery 1, received from the battery powered device 104-1. In some implementations, adjusting a charging rate includes adjusting a voltage and/or current supplied to the battery by the charging device 102.

At a first time, $T_0$, battery 2 in the charging device 102 is below a preferred charge range 402 for the battery. In some implementations, the preferred charge range 402 is based on chemistry of battery 2. In some implementations, the preferred charge range 402 is based on a battery type of battery 2. In some implementations, the preferred charge range 402 is prescribed by the manufacturer of battery 2. At time $T_0$ battery 1 is at full charge (e.g., batteries 1 and 2 were swapped just prior to $T_0$).

At a second time, $T_1$, although battery 1 is still near full charge, battery 2 is charged up so that it is within the preferred charge range 402. In some implementations, battery 2 is charged up at, or near (e.g., within 80%, 90%, or 95% of) a maximum charging rate for battery 2 so as to bring the charge level of battery 2 within the preferred range 402 as quickly as possible. In some implementations, battery 2 is charged up at, or near (e.g., within 80%, 90%, or 95% of) a maximum charging rate for the charging device 102 so as to bring the charge level of battery 2 within the preferred range 402 as quickly as possible. From time $T_1$ to time $T_2$, battery 2 is maintained within the preferred range 402 because battery 1 has a charge level above the threshold $C_1$.

At a third time, $T_2$, the charge level of battery 1 drops below the threshold charge level, $C_1$, and corresponding battery 2 is charged up beyond the preferred range 402 toward full charge (in preparation for swapping it into the battery powered device 104-1). In some implementations, battery 2 is charged up between times $T_2$ and $T_3$ at a maximum charging rate (e.g., as specified by the battery manufacturer or the capabilities of the charging device 102). In some implementations, battery 2 is charged up between times $T_2$ and $T_3$ at a rate corresponding to a drain rate of battery 1, so that battery 2 is fully charged just before battery 1 depletes (e.g., days, hours, or minutes before battery 1 depletes).

At a fourth time, $T_3$, battery 1 is nearly depleted and battery 2 is at full charge in preparation for an imminent swap. In some implementations, the user is prompted to switch the batteries at time $T_3$. In some implementations, the user is prompted by the battery powered device 104-1 (e.g., via a user interface on the camera), by the charging device 102 (e.g., via a user interface on the charging device 102), and/or is prompted via notification at a client device, such as the user's mobile phone.

In FIG. 4B, the charging device 102 is electrically coupled to battery 2 and is in communication with the battery powered device 104-1 using battery 1 and a client device 106. In accordance with some implementations, the charging device 102 in FIG. 4B is adjusting charging rates for battery 2 based on battery information from the battery powered device 104-1 and user information from the client device 106. At a first time, $T_0$, battery 2 in the charging device 102 is below a preferred charge range 402 for the battery and battery 1 is at full charge. At a second time, $T_1$, battery 2 is charged up sufficiently to have a charge level within the preferred charge range 402. From time $T_1$ to time $T_2$, battery 2 is charged up beyond the preferred range 402 as battery 1 depletes (e.g., the rate of charge of battery 2 is proportional to the rate of discharge of battery 1). At a third time, $T_2$, a user notification is received from the client device 106 indicating that the battery powered device 104-1 is going to be disabled for an extended period of time (e.g., the user is moving to a new location and is powering the camera down while the user moves). In response to the user notification, battery 2 is discharged (between time $T_2$ to time $T_3$) so that its charge level is brought back down to the preferred range 402. In some implementations, battery 2 is discharged at, or near (e.g., within 80%, 90%, or 95% of) a maximum discharge rate for battery 2 and/or the charging device 102 so as to bring the charge level for battery 2 back within the preferred range 402 as quickly as possible.

In the example illustrated in FIG. 4C, the charging device 102 is electrically coupled to battery 2 and is in communication with the battery powered device 104-1 using battery 1 and a battery powered device 104-2 using battery 3. In accordance with some implementations, the charging device 102 in FIG. 4C is adjusting charging rates for battery 2 based on battery information from the battery powered devices 104-1 and 104-2. At a first time, $T_0$, battery 2 in the charging device 102 is below a preferred charge range 402 for the battery and batteries 1 and 2 are at full charge. As in the examples of FIGS. 4A-4B, at a second time, $T_1$, battery 2 is charged up sufficiently to have a charge level within the preferred charge range 402. From time $T_1$ to time $T_2$, battery 2 is maintained within the preferred range 402 as neither battery 1 nor battery 3 is near depletion. At a third time, $T_2$, the charge level of battery 3 begins to drop rapidly (e.g., the battery powered device 104-2 is switched into a more active mode). Correspondingly, battery 2 is charged up toward full charge from $T_2$ to $T_3$ in anticipation of being swapped in for battery 3 around time $T_3$. In some implementations, the charging device 102 receives battery information from the battery powered device 104-2 (or from battery 3) that includes a current amount of charge in battery 3 as well as a drain rate for battery 3. In some implementations, battery 2 is charged up to full charge based on a high drain rate for battery 3. In some implementations, the current charge amount and the drain rate of battery 3 are used to determine an estimated depletion time for battery 3, and the charging rate for battery 2 is adjusted so that battery 2 is fully charged before the estimated depletion time of battery 3.

Figure 5A:
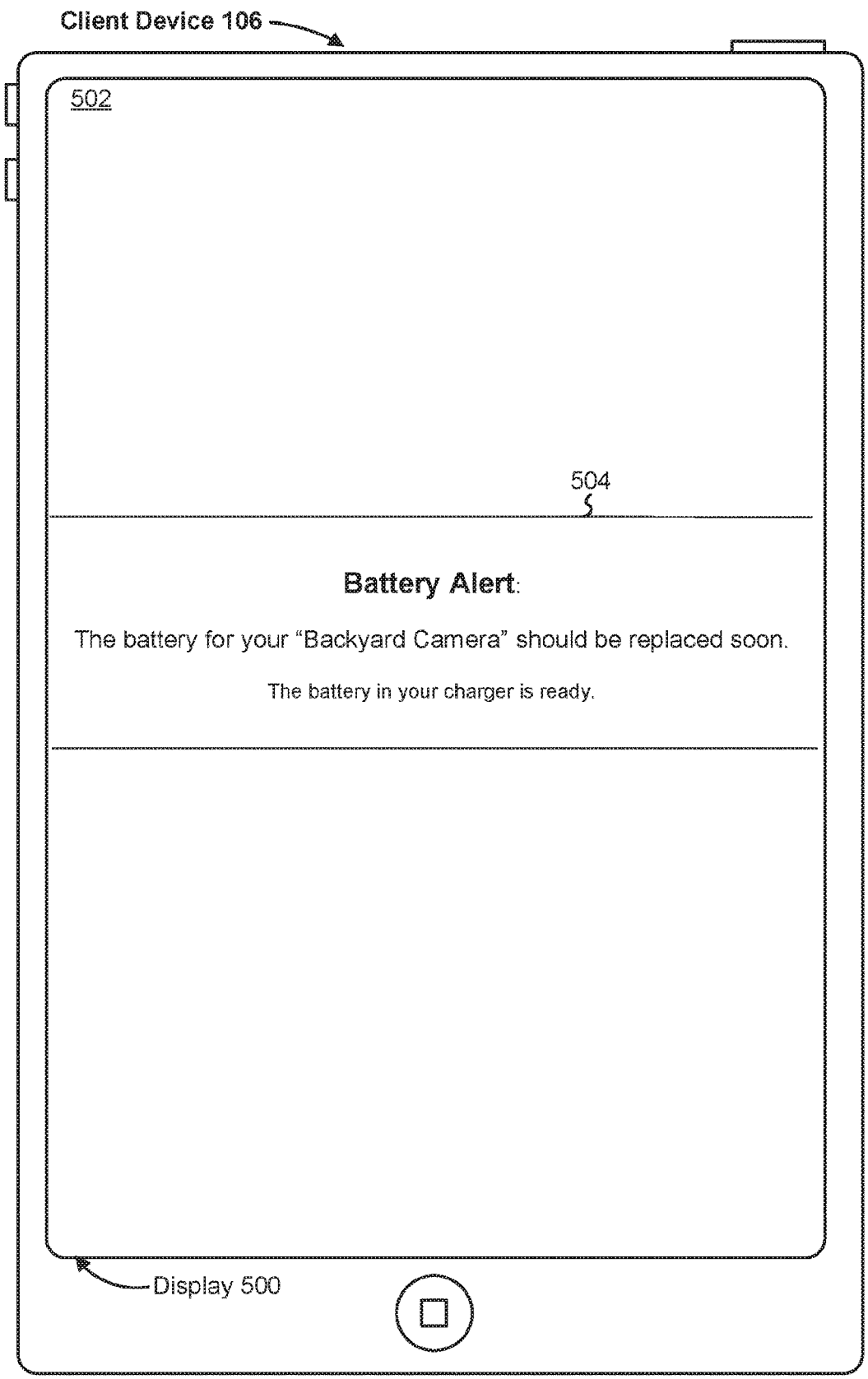

FIG. 5A illustrates an example battery notification in accordance with some implementations. As shown in FIG. 5A, a client device 106 includes a display 500 (e.g., a touch screen) with a graphical user interface 502. In some implementations, the graphical user interface 502 is a lock screen of the client device with displayed user notifications. In some implementations, the graphical user interface 502 is an application home screen or notification screen. The graphical user interface 502 includes a battery notification 504 for the user (e.g., an SMS notification, an email notification, or an application notification). In accordance with some implementations, the battery notification 504 includes information regarding which device requires a battery swap and whether there is a replacement battery ready. In some implementations, the battery notification 504 includes an estimated depletion time for the battery in the device ("Backyard Camera") (e.g., 2 hours, 3 days, etc.).

FIG. 5B illustrates other example battery notifications in accordance with some implementations. The notification 550 includes information regarding a battery needing charging and the device ("Backyard Camera") in which the battery is currently installed. The notification 550 also includes information regarding ordering additional batter(ies) to minimize device downtime. In some implementations, in response to a user selection, a shopping user interface is presented to the user with options to purchase batteries and battery charging device. In some implementations, a calendar event is added to the user's calendar to prompt the user to charge the battery in the Backyard Camera, e.g., at a time that is determined to be convenient to the user such a time when the user will be in the vicinity of the Backyard Camera and does not have a preexisting engagement scheduled. In some implementations, the notification 550 is displayed in accordance with a determination that the user does not have a back-up (replacement) battery to swap into the Backyard Camera, and the notification 504 is displayed in accordance with a determination that the user does have a back-up (replacement) battery.

The notification 552 includes information regarding a battery needing to be disposed of and a device in which the battery is currently installed. In some implementations, the battery is determined to by near end-of-life based on battery information obtained from the battery or determined based on battery charge and/or discharge information (e.g., obtained from the Backyard Camera and/or a charging device). In accordance with some implementations, the notification 552 includes links to disposal information for the current battery and ordering information for a new battery. In some implementations, in response to a user selection of the order link, a shopping user interface is presented to the user with options to purchase batteries and battery charging device. In some implementations, in response to a user selection of the disposal link, a disposal user interface is presented to the user with local battery disposal services and options. In some implementations, the notification 552 includes information regarding why the battery is considered to be near end-of-life (e.g., increased impedance and/or swell and lowered charge capacity). In some implementations, the battery management system (e.g., the charging device or server system) monitors state-of-health information for non-rechargeable and/or non-replaceable batteries (e.g., an embedded battery in a hazard detector). In some implementations, the battery management system generates a notification, such as notification 552, when a non-rechargeable battery is determined to be at end-of-life. In some implementations, the battery management system generates a notification when a non-replaceable battery is determined to be at end-of-life. In some implementations, the notification regarding a non-replaceable battery at end-of-life includes options for ordering or acquiring a new device and/or options for disposing of the current device.

The notification 554 includes information regarding a battery needing charging and the device in which the battery is currently installed. For example, the user is scheduled to leave for Kansas in six days and remain in Kansas for two weeks, whereas the battery in the Backyard camera is estimated to deplete in fourteen days. Therefore, a notification is sent to the user to replace the battery in the Backyard Camera prior to leaving for Kansas. In some implementations, the notification is generated by an assistant system based on information in the user's shared electronic calendar.

Although FIGS. 5A-5B illustrate visual notifications, in some implementations, the battery management system conveys the notification information to the user via an audio notification (e.g., utilizing a user interaction module 434). For example, a user device with speakers may "read" the notifications 504, 550, 552, and 554 to the user. As another example, a user device with an assistant application or program (also sometimes called an assistant device) may audibly convey the information to the user. In some implementations, the battery management system audibly conveys the notification information to the user and lists actions a user may take, such as ordering new batteries or obtaining disposal information. In some implementations, a user device listens for a response from the user, such as a user selection of one of the listed actions, and responds accordingly (e.g., obtaining and audibly conveying disposal options to the user).

Figure 6A:
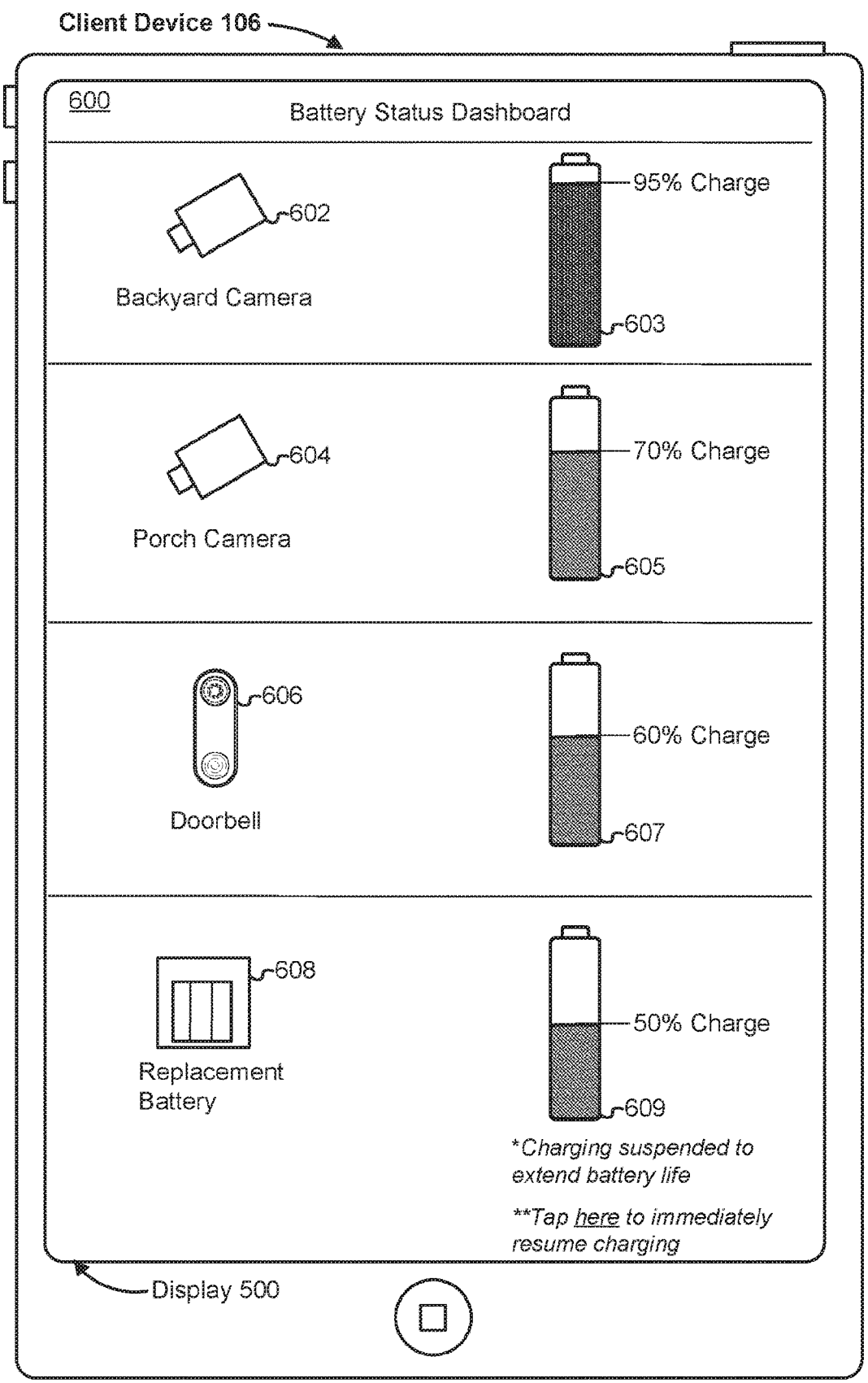
FIGS. 6A-6B illustrate representative graphical user interfaces for battery management in accordance with some implementations.
Figure 6B:
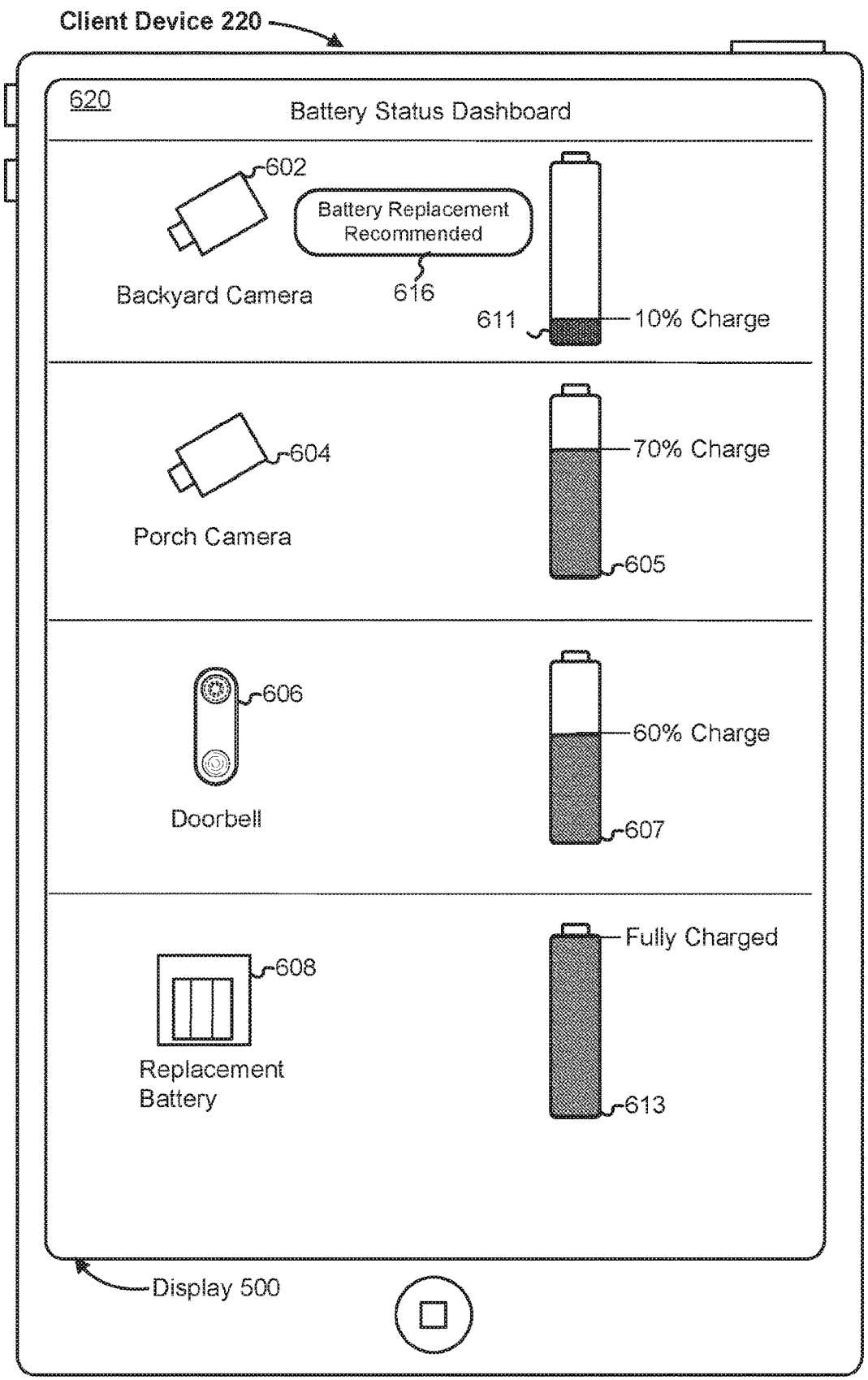

FIGS. 6A-6B illustrate representative graphical user interfaces for battery management in accordance with some implementations. FIG. 6A shows a graphical user interface 600 (e.g., displayed within an assistant application on the user's client device) that includes information on a plurality of battery powered devices 104. In some implementations, the user interface 600 is displayed in response to a user selection of a device list affordance within an assistant application. In some implementations, the user interface 600 is displayed in response to a user selection of a battery management affordance within an assistant application. In accordance with some implementations, each battery powered device 104 listed on the user interface 600 includes indication of a device type (e.g., camera, doorbell, thermostat, charging device), a device label, and battery information for batteries associated with each device. In some implementations, a battery identifier is display, e.g., to assist users in tracking individual batteries. In the example in FIG. 6A, the Backyard Camera device 602 has a battery with a current charge level 603 of 95% of full charge, the Porch Camera device 604 has a battery with a current charge level 605 of 70% of full charge, and the Doorbell device 606 has a battery with a current charge level 607 of 60% of full charge. The user interface 600 includes display of a state of the replacement battery 608 installed in a battery charging device 102. In the example of FIG. 6A, the replacement battery 608 is being maintained at a charge level 609 of 50% of full charge (e.g., within a preferred charge range for the battery). In accordance with some implementations, the replacement battery charging information includes a notice to the user that charging is suspended to extend battery life and an option for the user to override the charging device state and resume charging of the battery (e.g., so that the user may replace an in-use battery sooner than was calculated by the charging device 102 or battery management system).

FIG. 6B shows a graphical user interface 620 similar to the user interface 600 of FIG. 6A, except that the Backyard Camera device 602 in FIG. 6B has a battery with a current charge level 611 of 10% of full charge, and therefore a replacement recommendation 616 is displayed and the charging device 102 has fully charged (613) the replacement battery 608.

Although FIGS. 6A-6B illustrate graphical user interfaces, in some implementations, the battery management system conveys the information of the user interface to the user via audio interactions (e.g., utilizing a user interaction module 434). For example, a user may ask an assistant device to: (1) relay battery information for the user's battery powered devices, (2) relay a current state of the replacement battery, or (3) relay whether any battery powered devices are near depletion. In this example, the assistant device would relay the information shown in the user interfaces in FIGS. 6A-6B that is responsive to the user's query. In some implementations, the information is relayed to the user audibly and/or visibly and the user may interact via audio commands or selections within the user interface. In various implementations, the assistant device is the battery charging device, a hub device, a battery powered device 104, a mobile phone, a tablet, and the like.

Figure 7:
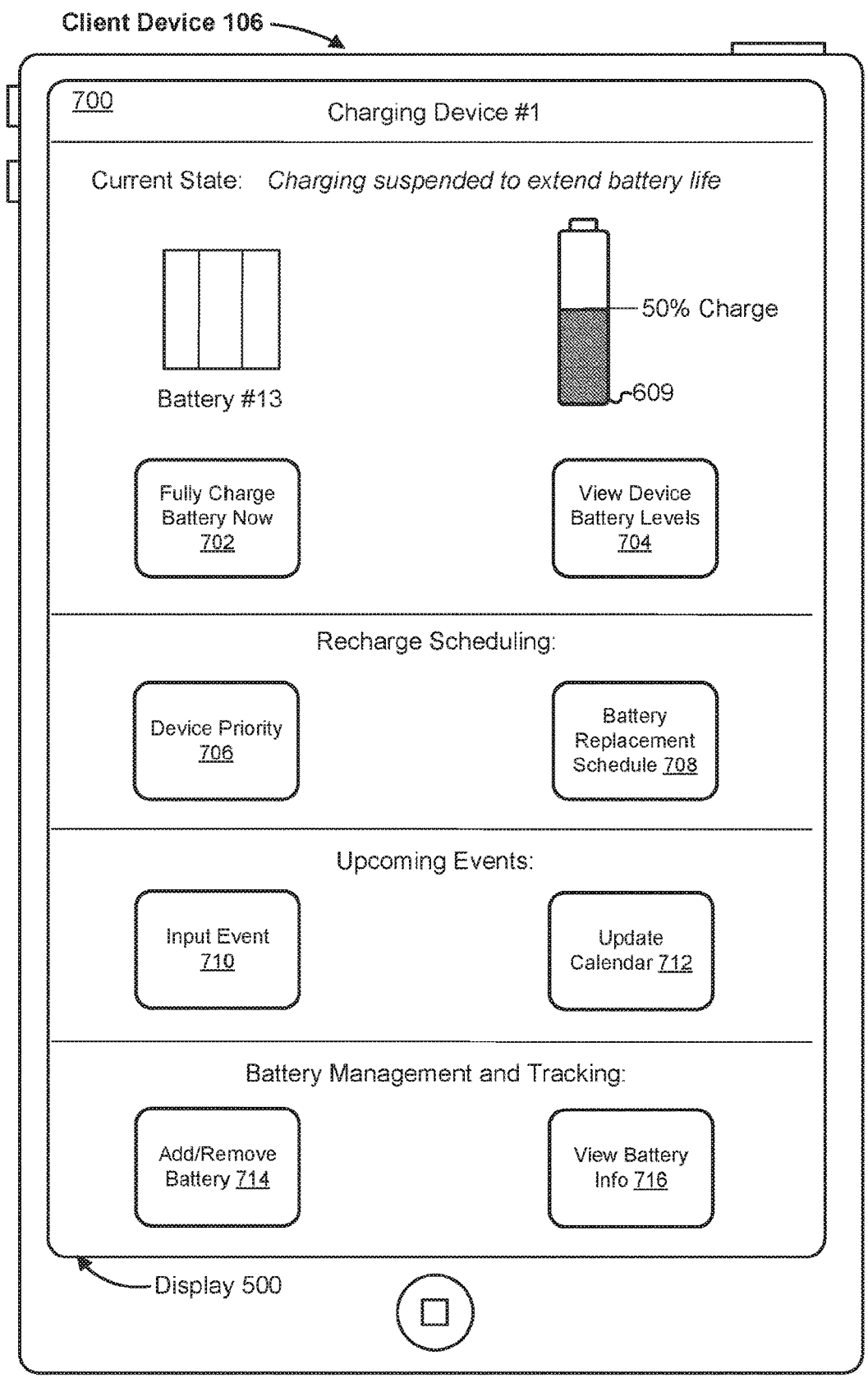
FIG. 7 illustrates a representative graphical user interface for battery management in accordance with some implementations.

FIG. 7 illustrates a graphical user interface 700 for battery management in accordance with some implementations. The user interface 700 includes information regarding batter(ies) electrically coupled to (e.g., mounted on) a battery charging device 102. The user interface 700 further includes a plurality of affordances (e.g., software buttons) for user battery management. In the example of FIG. 7, a charging device identified as charging device #1 is currently managing charging of a battery identified as battery #13. As shown in FIG. 7, battery #13 is currently being maintained at a charge level 609 of 50% charge, e.g., because no in-use battery is near depletion. The user interface 700 in FIG. 7 is intended as a non-limiting example. In some implementations, a subset or superset of the affordances and information shown in FIG. 7 are presented to a user. In some implementations, one or more of the affordances shown in FIG. 7 are presented to users on other user interfaces, such as the user interfaces shown in FIGS. 6A-6B.

In some implementations, the user interface 700 is displayed in response to selection of a battery charging device affordance (or battery affordance) within an assistant application or battery management application. In some implementations, the user interface 700 is displayed as part of a home screen in a battery management application. In some implementations, the user interface 700 is displayed on a display of the battery charging device 102.

The user interface 700 includes a full charge affordance 702 and a device batteries affordance 704. In some implementations, in response to a user selection of the full charge affordance 702, the charging device 102 charges battery #13 toward full charge (e.g., switches from a maintenance or discharge mode to a charging mode). In some implementations, charging the battery toward full charge includes charging the battery at a maximum charge rate for the battery or the battery charging device. In some implementations, in response to a user selection of the device batteries affordance 704, a user interface is presented with information regarding batteries in-use in various associated electronic devices (e.g., the user interface 600 or 1050 is presented).

The user interface 700 includes a recharge scheduling section with device priority affordance 706 and schedule affordance 708. In some implementations, in response to a user selection of the device priority affordance 706, a device listing user interface is presented where the user is enabled to rank the devices by priority. In some implementations, the user ranking is utilized to determine priority and/or scheduling of battery replacements. For example, if the doorbell 606 in FIG. 6A is ranked as highest priority, and both the doorbell 606 and the porch camera 604 are near depletion, then the battery management system (e.g., battery charging device 102 and/or server system 108) will recommend that the user swap the battery in the doorbell 606 before swapping a battery in the porch camera 604. In some implementations, the battery management system will recommend swapping batteries for higher ranked devices at higher charge levels. For example, the battery management system may recommend swapping the battery for the doorbell ranked as highest priority when the in-use battery is at 30% charge. In this example, the battery management system may recommend swapping the battery for the doorbell ranked as second highest priority when the in-use battery is at 20% charge. As another example, the battery management system may recommend swapping the battery for the doorbell ranked as highest priority when the in-use battery is estimated to deplete in 7 days. In this example, the battery management system may recommend swapping the battery for the doorbell ranked as second highest priority when the in-use battery is estimated to deplete in 3 days.

In some implementations, in response to a user selection of the schedule affordance 708, a scheduling user interface is presented to the user. In some implementations, the scheduling user interface enables a user to set and/or revise a battery charging (and swapping) schedule. In some implementations, the user may indicate how often, or on what days, the user prefers to exchange batteries in their battery powered electronic devices. Having a schedule helps prevent multiple devices from needing battery replacements at the same time and therefore can minimize downtime due to drained batteries. For example, the user may indicate that they wish to swap a camera's batteries on the first day of every second month and swap a doorbell's batteries on the fifteenth day of every third month. In some implementations, the user is provided with information regarding an estimated amount of time each battery with drain within a particular device. For example, the user is notified that a camera will drain a fully charged battery in approximately 4 months while a doorbell will drain a fully charged battery in approximately 1 year. Thus, the user is able to schedule dates that are within the estimated drain time for each battery and device. In some implementations, the estimated drain time is based on the user's usage patterns, the battery's health, and the like.

The user interface 700 includes an event scheduling section with an input event affordance 710 and calendar affordance 712. In some implementations, in response to a user selection of the input event affordance 710, an event user interface is presented to the user. In some implementations, the event user interface enables a user to input information regarding an upcoming event that will impact battery usage and/or charging. For example, the user may indicate that he or she is going on vacation for several weeks and thus a doorbell will be disabled or in low power mode for that time. Therefore, the battery management system (e.g., the battery charging device 102 and/or the server system 108) extends an estimated drain date for the doorbell by several weeks. As another example, the user may indicate that he or she is going to keep an indoor camera active continuously while he or she is away (rather than disabling it during the day). Therefore, the battery management system reduces an estimated drain date for the indoor camera by several weeks. As another example, the user indicates that he or she will be away on dates that would otherwise be battery swap dates (e.g., dates when an in-use battery is drained or dates that the user has scheduled to swap batteries). In this example, the battery management system notifies the user to swap the battery prior to the user leaving, or reschedule the swap date (e.g., for after the user returns).

In some implementations, in response to a user selection of the calendar affordance 712, a calendar interface is presented to the user. In some implementations, the calendar interface enables a user to import or share his or her electronic calendar (e.g., for the purposes of estimating drain times and scheduling battery swap dates). In some implementations, the calendar interface enables a user to input or revise calendar events (e.g., events impacting battery drain rates and/or scheduled battery swap dates).

The user interface 700 includes a battery section with an add/remove battery affordance 714 and a view battery information affordance 716. In some implementations, in response to a user selection of the battery add/remove affordance 714, a battery management user interface is presented to the user. In some implementations, the battery management user interface enables a user to add new batteries for the battery management system to track and management (e.g., add batteries the user has recently purchased). In some implementations, the battery includes a barcode (or other scannable information) and the battery management user interface enables a user to scan or capture the barcode so that the information is received by the battery management system. In some implementations, the battery management system receives new battery information from the battery charging device 102 or a battery powered electronic device once the battery is coupled to those devices. In some implementations, the battery management user interface enables a user to remove batteries from the battery management system (e.g., remove batteries the user has recently disposed of or given away).

In some implementations, in response to a user selection of the battery information affordance 716, a battery information interface is presented to the user. In some implementations, the battery information interface enables a user to view or revise information on batteries tracked by the battery management system. For example, the user may be allowed to enter information regarding battery specifications, intended use, past usage, and the like. In some implementations, the battery information interface includes a battery management table (e.g., battery management table 800, FIG. 8A) and/or a device management table (e.g., the device management table 810, FIG. 8B).

Although FIG. 7 illustrates a graphical user interfaces, in some implementations, the battery management system conveys the information of the user interface to the user via audio interactions (e.g., utilizing a user interaction module 434). For example, a user may ask an assistant device to relay: (1) a current state of the replacement battery, (2) current charge levels for the user's battery powered devices, (3) current device priorities, (4) current battery replacement schedule, or (5) battery information. As another example, a user may verbally instruct an assistant device to: (1) fully charge replacement battery, (2) display current battery levels, (3) adjust device priorities, (4) adjust the battery replacement schedule, (5) update a user's calendar, (6) add/remove batteries from tracking, or (7) display battery information.

FIGS. 8A-8B illustrate representative tables for battery and device management in accordance with some implementations. FIG. 8A shows a battery management table 800 that includes a listing of batteries in use and/or charging. In accordance with some implementations, the battery management table 800 includes, for each battery, a battery identifier, a device identifier for the device in which the battery is currently located, a current charge level, a maximum charge level, and an estimated life. In some implementations, the battery management table 800 includes a superset or subset of the information shown in FIG. 8A. For example, the battery management table 800 optionally includes impedance information, chemistry information, manufacturer specifications, and/or swell information. As another example, estimated life for each battery is displayed, but the maximum charge information is not. In some implementations, batteries are added to the table manually by a user. In some implementations, batteries are added to the table in response to a user scanning a barcode or other visual information for the battery. In some implementations, batteries are added to the table in response to deployment in a user's device (e.g., automatically and/or without user interaction). For example, the battery submits its information to the battery management system during deployment.

In some implementations, the current charge level is obtained from the battery. In some implementations, the current charge level is estimated (e.g., by the device in which the battery is located or the server) based on battery characteristics and usage. In some implementations, the maximum charge information is estimated based on battery health information and/or characteristics (e.g., data obtained by a charging device 102 during a maintenance cycle), such as state-of-charge information, voltage values, temperature values, capacity, impedance, direct current resistance (DCR), and/or current values. In some implementations, the estimated life information is determined based on battery health information and/or characteristics (e.g., data obtained by a charging device 102 during a maintenance cycle).

FIG. 8B shows a device management table 810 that includes a listing of the user's battery powered devices. In accordance with some implementations, the device management table 810 includes, for each device, a device identifier, a device label, a current charge level, an estimated time until battery depletion, and priority level. In some implementations, the device management table 810 includes a superset or subset of the information shown in FIG. 8B. For example, the device management table 810 optionally includes a battery identifier for the battery in each device. As another example, the device label for each device is included, but the device identifier is not. In some implementations, the device priority is set or adjusted by the user (e.g., via the device priority affordance 706, FIG. 7). In some implementations, the device labels are received from a user (e.g., via an assistant application or battery management application).

In some implementations, the battery management table 800 and/or the device management table 810 is stored at (and maintained by) a charging device (e.g., the charging device 102). In some implementations, the battery management table 800 and/or the device management table 810 is stored at (and maintained by) a server (e.g., the server system 108).

The following examples illustrate utilizing battery chemistry, user preferences, user usage patterns, scheduling information, and battery state-of-charge information to adjust charging rates and extend battery longevity in accordance with various implementations.

Example 1: A first battery is in use in an electronic device and a second battery is mounted in a battery charging device. In this example, if the first battery conveys that it is at more than 80% of full charge, the second battery is maintained at around 50% of full charge (or within a preferred charge range based on the particular chemistry of the battery). For example, the first battery may convey its state-of-charge information via an integrated state-of-charge chip and communication circuitry.

In accordance with some implementations, the battery charging device utilizes a variety of charging modes for a replacement battery, e.g., based on state-of-charge information for the one or more in-use batteries. The charging modes optionally include one or more of: (1) a maintenance mode where the charging battery is maintained at partial charge (e.g., within a preferred charge range); (2) a measurement mode where the charging battery is charged/discharged to determine battery characteristics such as capacity, impedance, direct current resistance (DCR), and the like; (3) a charge-up mode where the charging battery is charged toward full charge in anticipation of immediate use; and (4) a charge-down mode where the charging battery is discharged (e.g., actively or passively), e.g., in response to updated information indicating that immediate use is unlikely.

Example 2: A battery with NCA chemistry (e.g., a lithium nickel cobalt aluminum oxide battery) at 2150 mAh minimum capacity (C-rate) with a top of charge voltage of 4.2 V and cut-off voltage of 2.5 V. The battery specifications include a standard charge of 1375 mA and maximum discharge of 5500 mA, with a preferred cell storage voltage range of 3.75 V (57% SOC) to 3.55 V (24% SOC). In this example, the battery specifications are provided to a battery management system. For example, the battery specifications are stored in a database accessible to the battery management system, or are transmitted to the battery management system as part of a battery registration process. The data provided to the battery management system optionally includes: a cell date code, a pack date code, and a timestamp of when battery is put into ship mode, in addition to the cell chemistry specifications.

In this example, the following triggers for a cell maintenance cycle are used. First, after one week, SOC is stepped down from 100% to 80% via discharge path at a rate that does not exceed the maximum rated discharge current and a rate that does not exceed over discharge current protection within a protection circuit module (PCM). Second, after two weeks, SOC is stepped down from 80% to within cell storage range of 3.75 V (57% SOC) and 3.55 V (24% SOC). Third, after one month, maintenance cycle for capacity check and DCR check (1 C pulse for 1 second) is performed via a five-hour (C/5) discharge down to 3.0 V (or near system shutdown) and a constant current charge C/5 to 4.2 V with a twenty-hour (C/20) charge termination. Then, a discharge C/5 to near shut-down voltage (e.g., 3.2 V), for capacity check and charge back to full at 4.2 V. Optionally, the above steps are then repeated until indication of imminent use is received.

Example 3: A battery with LCO chemistry (e.g., a lithium cobalt oxide battery) at 560 mAh minimum capacity (C-rate) with a top of charge voltage of 4.2 V and cut-off voltage of 3.0 V. The battery specifications include a standard charge of 112 mA and maximum discharge of 560 mA, with a preferred cell storage voltage range of 3.9 V (65% SOC) to 3.8 V (47% SOC). In this example, the battery specifications are provided to a battery management system. For example, the battery specifications are stored in a database accessible to the battery management system, or are transmitted to the battery management system as part of a battery registration process. The data provided to the battery management system optionally includes: a cell date code, a pack date code, and a timestamp of when battery is put into ship mode, in addition to above cell chemistry specifications.

In this example, the following triggers for a cell maintenance cycle are used. First, after one week, SOC is stepped down from 100% to 80% via discharge path at a rate that does not exceed the maximum rated discharge current and a rate that does not exceed over discharge current protection within PCM. Second, after two weeks, SOC is stepped down from 80% to within cell storage range of 3.9 V (65% SOC) and 3.8 V (47% SOC). Third, after one month, a maintenance cycle is performed for capacity check and DCR check (1 C pulse for 1 second) via a C/5 discharge down to 3.0 V (or near system shutdown) and constant current charge at C/5 to 4.2 V with a C/20 charge termination. Then, discharge at C/5 to near shut-down voltage (e.g., 3.2 V), for capacity check and charge back to full at 4.2 V. Fourth, after three consecutive months of maintenance cycle, a storage and self discharge cycle is triggered. The battery pack is charged to 100% SOC and discharge at C/5 to near shut-down voltage (e.g., 3.2 V), for capacity check, then constant current charge at C/5 to 4.2 V with a C/20 charge termination. The charger is then fully disabled, allowing voltage relaxation and self discharge. After 2-4 weeks, discharge at C/5 to near shut-down voltage (e.g., 3.2 V), for remaining capacity check.

Adjusting charging rates and maintenance cycles based on battery chemistry, allows a user access to a fully charged reserve battery pack on the charger device when needed, while maintaining battery longevity.

Example 4: A user has a battery powered device (e.g., a wireless camera) with a first removable battery pack and a charging device with a second removable battery pack. While the first battery pack is between 80% and 50% SOC, the second battery pack is maintained at around 50% SOC (or in accordance with cell long term storage recommendations for the particular chemistry type). In some implementations, the second battery pack is charged to full after the first battery pack is below a threshold SOC (e.g., 20%, 30%, or 50% SOC), where the threshold SOC is based on learning the user's preferences and usage patterns. Learning the user's preferences and usage patterns enables a high probability for the user to swap in the second battery while it is at (or near) full charge. In this scenario, the user may not even be aware of the battery maintenance operations carried out by the charging device.

In accordance with some implementations, the user could activate a "vacation" mode for the user's home (or one or more battery powered devices) or schedule a vacation on the user's electronic calendar. Upon learning of the user's planned vacation, the charging device, or a server system in communication with the charging device, generates a notification for the user to swap out an in-use battery pack for a charged battery (e.g., before the in-use battery pack would otherwise be swapped out) to ensure that the battery powered device (e.g., a security camera) does not run out of charge during the vacation period. Upon learning of the user's planned vacation, the charging device adjusts charging rates for the second battery pack to ensure that it is ready to be swapped in prior to the vacation period.

Example 5: A user has a battery powered device (e.g., a wireless camera) with a first removable battery pack and a charging device with a second removable battery pack. While the first battery pack is below 50% SOC, the second battery pack is maintained around 80% SOC, and charged to full based on learning behavior of the user's inclination to swap out battery packs. This enables a high probability that the user swaps in the second battery while it is at, or near, full charge.

Example 6: A user has a battery powered device (e.g., a wireless camera) with a first removable battery pack and a charging device with a second removable battery pack. In this example, the user checks on the status of the second battery pack while it is within a charge/discharge maintenance cycle. In some implementations, the customer is notified (e.g., via an application on the user's mobile device) of the current maintenance cycle. In accordance with some implementations, the user indicates they are need of the second battery pack immediately (e.g., via a corresponding button or other affordance), and the charging device halts the charge/discharge maintenance cycle and instead prepares the battery to be fully charged. In some implementations, a charge timer and/or estimated charge completion time is presented to the user (e.g., via the application on the user's mobile device).

Example 7: A user has a battery powered device (e.g., a wireless camera) with a first removable battery pack and a charging device with a second removable battery pack. In this example, the user checks on the status of second battery pack while it is maintained at 50% SOC for battery longevity. In accordance with some implementations, the user is able to use a software button press (or other affordance) to request that the second battery pack be fully charged within a timer period. In accordance with some implementations, the user is notified when the second battery pack is at full charge (ready to be swapped with the first battery pack). In accordance with some implementations, if the user does not subsequently swap out the battery packs within a threshold amount of time, the second battery pack is brought back down from full charge (e.g., via a discharge mode or maintenance cycle).

Example 8: A user has a battery powered device (e.g., a wireless camera) with a first removable battery pack and a charging device with a second removable battery pack. In this example, the user swaps out the first battery pack for the second battery pack without checking the charge status of the second battery pack. In accordance with some implementations, the user is notified if the swap occurs at a time when the second battery pack is not near full charge (e.g., in a maintenance cycle or during a low SOC long term storage state). In accordance with some implementations, the charging device charges the first battery pack to full (e.g., without maintaining it in a preferred charge range). In this example, the user allows the first battery pack to fully charge then swaps out with second battery pack during the relatively short charge period. This ensures maximum operating use of the device within a single charge, if an unintentional battery swap has taken place with non-optimal battery life expectations for the device.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first camera could be termed a second camera, and, similarly, a second camera could be termed a first camera, without departing from the scope of the various described implementations. The first camera and the second camera are both cameras, but they are not the same camera unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
   at a battery charging device that includes one or more processors and memory:
   receiving first battery life information for a first battery installed in an electronic device; and
   based on the first battery life information, adjusting a charging rate for a second battery, the second battery electrically-coupled to the battery charging device and separate from the electronic device, the second battery configured for use in the electronic device.

2. The method of claim 1,
   wherein the first battery life information indicates that the first battery will deplete by a particular time; and
   wherein adjusting the charging rate comprises setting the charging rate so that the second battery will be fully charged by the particular time.

3. The method of claim 1, further comprising:
   determining a time period for depletion of the first battery based on the first battery life information;
   in accordance with a determination that the time period for depletion exceeds a predetermined amount of time, forgoing charging the second battery; and
   in accordance with a determination that the time period for depletion does not exceed the predetermined amount of time, charging the second battery at a rate sufficient to fully charge the battery by the end of the time period for depletion.

4. The method of claim 3, further comprising:
   obtaining a current charge level for the second battery; and
   in accordance with a determination that the current charge level exceeds a predefined threshold charge amount and a determination that the time period for depletion exceeds the predetermined amount of time, actively draining charge from the second battery.

5. The method of claim 1, further comprising:
   receiving a notification from a user of the electronic device, the notification including second battery life information for the first battery; and
   adjusting the charging rate for the second battery based on the second battery life information.

6. The method of claim 5, wherein the second battery life information indicates one or more of a predicted usage of the electronic device by the user, or a user desire to install the second battery in the electronic device at a particular time.

7. The method of claim 5,
   wherein the notification indicates a user will be away from the electronic device during a particular time period, and
   wherein the method further comprises sending a notification to the user to swap the first and second batteries prior to the particular time period.

8. The method of claim 1,
   wherein the first battery life information indicates an estimated depletion time for the first battery, and
   wherein the method further comprises maintaining the second battery at a charge level below a predefined threshold until a predefined amount of time before the estimated depletion time.

9. The method of claim 1, wherein the battery charging device includes a wireless radio component, and wherein the first battery life information is received via the wireless radio component.

10. The method of claim 1, further comprising:
    obtaining battery information for the second battery, the battery information including at least one of: charge capacity information, voltage level information, temperature information, and optimal charge range information,
    wherein at least a portion of the battery information for the second battery is obtained from the second battery or determined based on monitoring charging and discharging of the second battery.

11. The method of claim 1, wherein the electronic device comprises a smart home device.

12. The method of claim 1, further comprising:
    obtaining user information for a user of the electronic device; and
    adjusting the charging rate for the second battery based on the first battery life information and the user information.

13. A computing system, comprising:
    one or more processors; and
    memory coupled to the one or more processors, the memory storing one or more programs configured to be executed by the one or more processors, the one or more programs including instructions that, when executed by the one or more processors, cause the one or more processor to:
    receive first battery life information for a first battery installed in an electronic device; and based on the first battery life information, adjust a charging rate for a second battery, the second battery electrically-coupled to the battery charging device and separate from the electronic device, the second battery configured for use in the electronic device.

14. A non-transitory computer-readable storage medium storing one or more programs, the one or more programs comprising instructions, which when executed by a computing system, cause the computing system to:
receive first battery life information for a first battery installed in an electronic device; and
based on the first battery life information, adjust a charging rate for a second battery, the second battery electrically-coupled to the battery charging device and separate from the electronic device, the second battery configured for use in the electronic device.

15. The computing system of claim 13, wherein the instructions further cause the computing system to:
determine a time period for depletion of the first battery based on the first battery life information;
in accordance with a determination that the time period for depletion exceeds a predetermined amount of time, forgo charging the second battery; and
in accordance with a determination that the time period for depletion does not exceed the predetermined amount of time, charge the second battery at a rate sufficient to fully charge the battery by the end of the time period for depletion.

16. The computing system of claim 15, wherein the instructions further cause the computing system to:
obtain a current charge level for the second battery; and
in accordance with a determination that the current charge level exceeds a predefined threshold charge amount and a determination that the time period for depletion exceeds the predetermined amount of time, actively drain charge from the second battery.

17. The computing system of claim 13, wherein the instructions further cause the computing system to:
receive a notification from a user of the electronic device, the notification including second battery life information for the first battery and indicating a user will be away from the electronic device during a particular time period;
adjust, based on the second battery life information, the charging rate for the second battery; and
send a notification to the user to swap the first and second batteries prior to the particular time period.

18. The non-transitory computer-readable storage medium of claim 14, wherein the instructions further cause the computing system to:
determine a time period for depletion of the first battery based on the first battery life information;
in accordance with a determination that the time period for depletion exceeds a predetermined amount of time, forgo charging the second battery; and
in accordance with a determination that the time period for depletion does not exceed the predetermined amount of time, charge the second battery at a rate sufficient to fully charge the battery by the end of the time period for depletion.

19. The non-transitory computer-readable storage medium of claim 18, wherein the instructions further cause the computing system to:
obtain a current charge level for the second battery; and
in accordance with a determination that the current charge level exceeds a predefined threshold charge amount and a determination that the time period for depletion exceeds the predetermined amount of time, actively drain charge from the second battery.

20. The non-transitory computer-readable storage medium of claim 14, wherein the instructions further cause the computing system to:
receive a notification from a user of the electronic device, the notification including second battery life information for the first battery and indicating a user will be away from the electronic device during a particular time period;
adjust, based on the second battery life information, the charging rate for the second battery; and
send a notification to the user to swap the first and second batteries prior to the particular time period.

* * * * *